(12) United States Patent
Gohshi et al.

(10) Patent No.: US 9,848,163 B2
(45) Date of Patent: Dec. 19, 2017

(54) IMAGE PROCESSING APPARATUS AND IMAGE PROCESSING METHOD

(71) Applicant: KEISOKU GIKEN Co., Ltd., Yokohama-shi, Kanagawa (JP)

(72) Inventors: Seiichi Gohshi, Yokohama (JP); Jin Ogasawara, Yokohama (JP); Shinichiro Nakamura, Yokohama (JP)

(73) Assignee: KEISOKU GIKEN Co., Ltd., Yokohama-shi, Kanagawa (JP)

( * ) Notice: Subject to any disclaimer, the term of this patent is extended or adjusted under 35 U.S.C. 154(b) by 113 days.

(21) Appl. No.: 14/912,451

(22) PCT Filed: Aug. 20, 2014

(86) PCT No.: PCT/JP2014/004268
§ 371 (c)(1),
(2) Date: Feb. 17, 2016

(87) PCT Pub. No.: WO2015/025521
PCT Pub. Date: Feb. 26, 2015

(65) Prior Publication Data
US 2016/0205342 A1    Jul. 14, 2016

(30) Foreign Application Priority Data
Aug. 20, 2013   (JP) ................ 2013-170756

(51) Int. Cl.
*G06K 9/40* (2006.01)
*H04N 7/01* (2006.01)
(Continued)

(52) U.S. Cl.
CPC .......... *H04N 7/0122* (2013.01); *G06T 5/003* (2013.01); *G06T 5/20* (2013.01); *H04N 5/21* (2013.01);
(Continued)

(58) Field of Classification Search
USPC ........ 382/263, 260, 254, 255; 348/441, 627, 348/699, E7.013; 375/240.12, 240.15
See application file for complete search history.

(56) References Cited

U.S. PATENT DOCUMENTS 8,508,667 B2 * 8/2013 Goshi .................. G06T 5/003
348/627
9,374,508 B2 * 6/2016 Gohshi
(Continued)

FOREIGN PATENT DOCUMENTS

EP        2320637 A1    5/2011
EP        2624536 A1    8/2013
(Continued)

OTHER PUBLICATIONS

Sep. 16, 2014, International Search Report issued in International Patent Application No. PCT/JP2014/004268.
(Continued)

*Primary Examiner* — Anh H Do
(74) *Attorney, Agent, or Firm* — Kenja IP Law PC

(57) ABSTRACT

For sharpening an input image by up-converting the input image in order to increase the number of pixels of an image and generating a frequency component higher than a frequency component contained in an input image signal representing the input image, the number of multipliers is reduced, thereby achieving significant downsizing of an apparatus and cost reduction. An image processing apparatus includes a path on a base image side for up-converting the input image signal and a path on a sharpening processing side for carrying out nonlinear arithmetic processing on the input image signal. The path on the sharpening processing side includes an up-converter at a subsequent stage of at least one filter, after which the nonlinear arithmetic processing is carried out. The at least one filter may be either a
(Continued)

two-dimensional low pass filter for noise removal or a high pass filter for removing a DC component.

28 Claims, 23 Drawing Sheets

(51) Int. Cl.
 *G06T 5/00* (2006.01)
 *G06T 5/20* (2006.01)
 *H04N 5/21* (2006.01)
 *H04N 7/015* (2006.01)
(52) U.S. Cl.
 CPC .......... *H04N 7/015* (2013.01); *H04N 7/0117* (2013.01); *H04N 7/0135* (2013.01)

(56) References Cited

U.S. PATENT DOCUMENTS

| 2010/0189373 A1 | 7/2010 | Ayzenberg |
| 2011/0279730 A1 | 11/2011 | Goshi et al. |

FOREIGN PATENT DOCUMENTS

| JP | H09-149323 A | 6/1997 | |
| JP | 2008-306497 A | 12/2008 | |
| JP | 2010-140460 A | 6/2010 | |
| JP | 20010200112 * | 9/2010 | ............ H04N 5/208 |
| JP | 2014-165679 A | 9/2014 | |
| WO | 2010/113342 A1 | 10/2010 | |
| WO | 2010/140281 A1 | 12/2010 | |
| WO | 2011/061958 A1 | 5/2011 | |
| WO | 2011/099202 A1 | 8/2011 | |
| WO | 2011/105377 A1 | 9/2011 | |
| WO | 2012/043407 A1 | 4/2012 | |

OTHER PUBLICATIONS

Jun. 17, 2014, Notice of Reasons for Refusal issued by the Japan Patent Office in the corresponding Japanese Patent Application No. 2013-170756.

Mar. 8, 2017, Extended European Search Report issued by the European Patent Office in the corresponding European Patent Application No. 14837499.4.

* cited by examiner

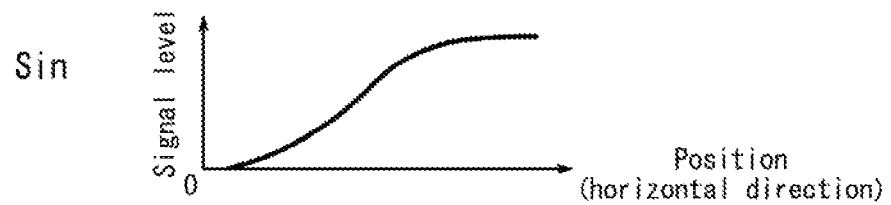
FIG. 2A — Sin
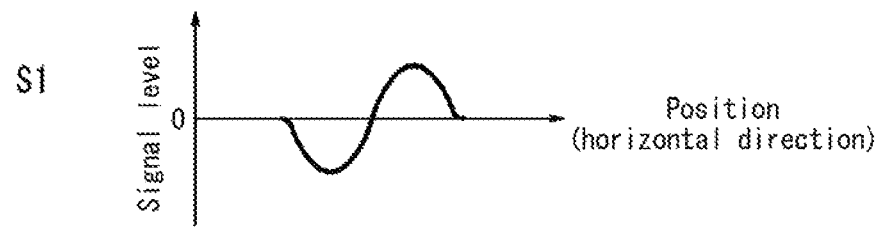
FIG. 2B — S1
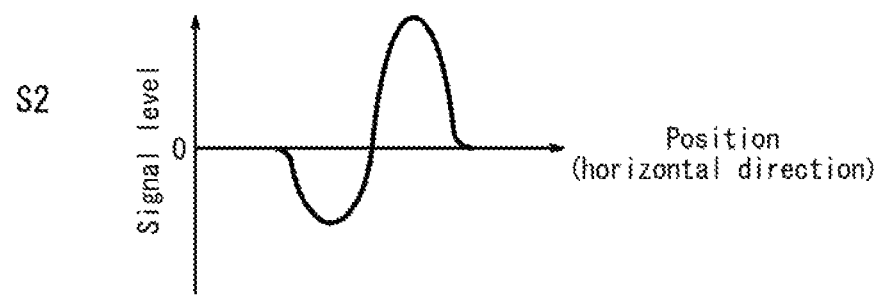
FIG. 2C — S2
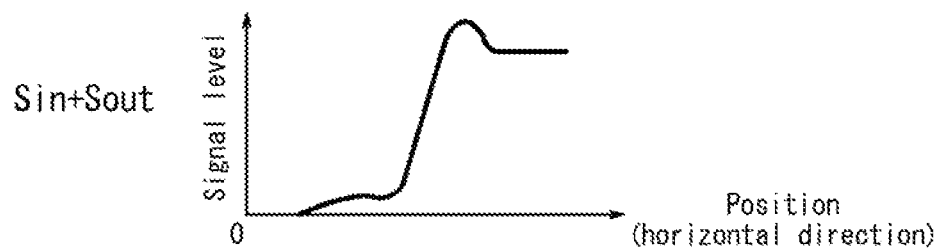
FIG. 2D — Sin+Sout

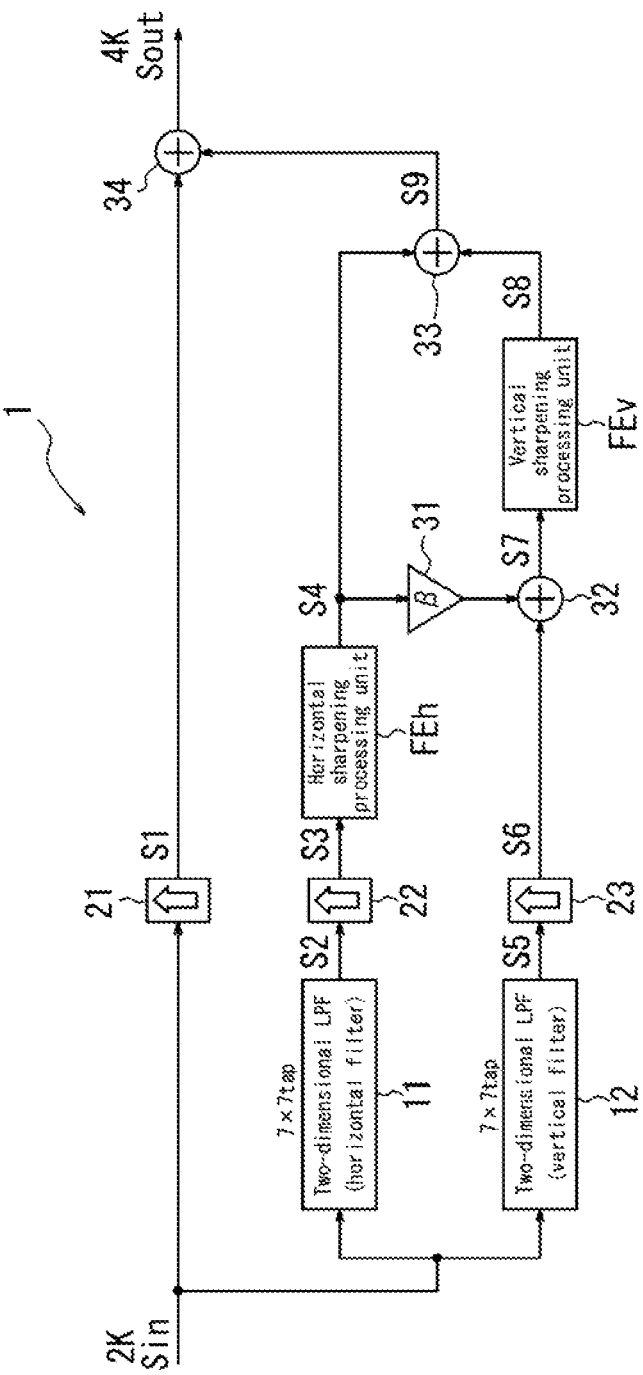

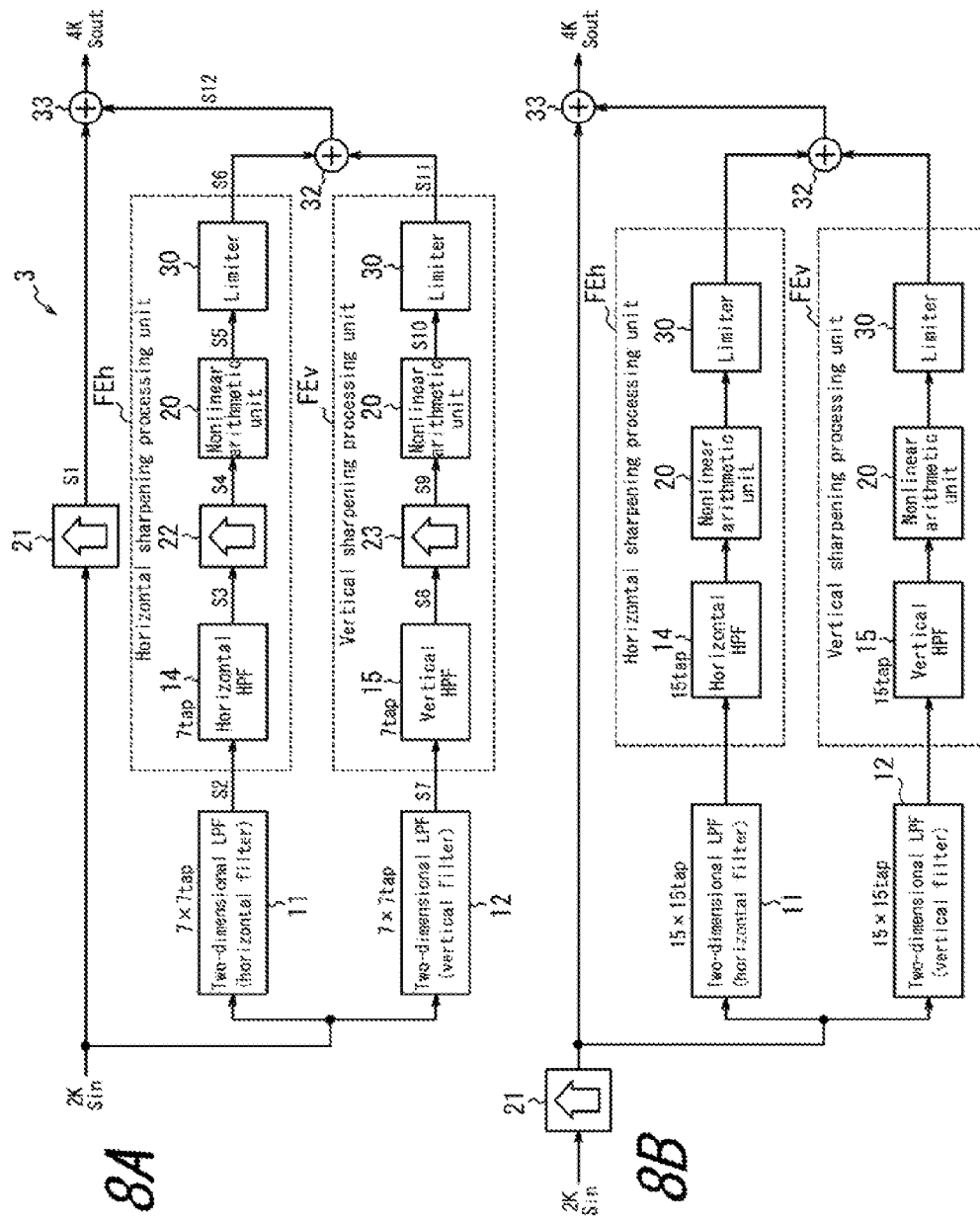

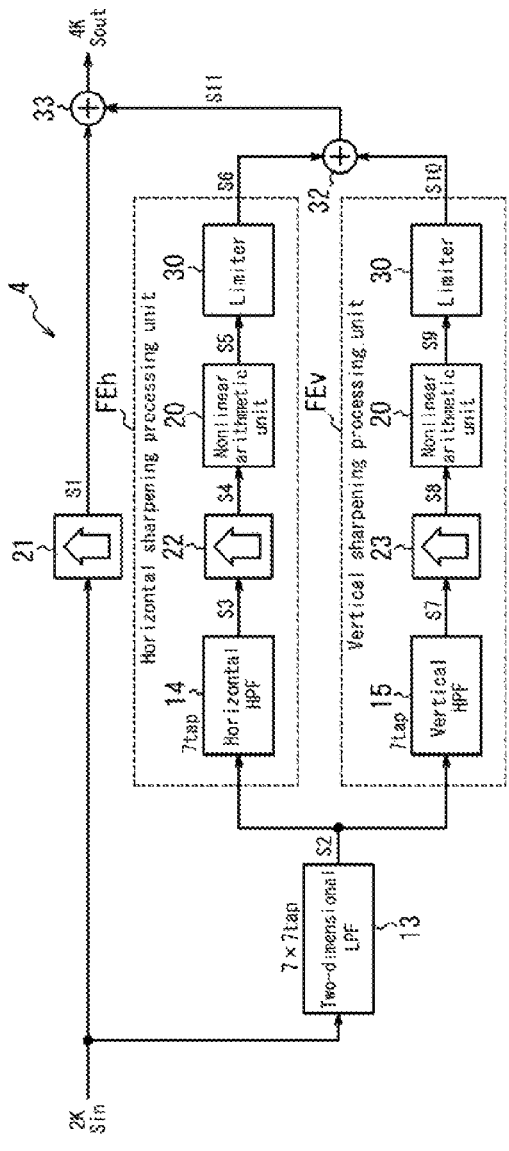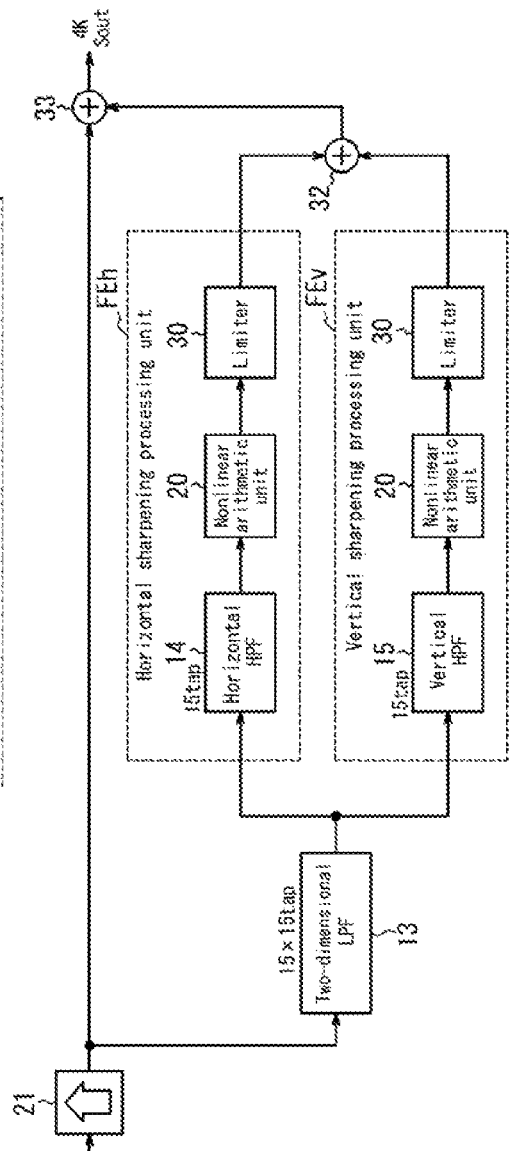
FIG. 9A
FIG. 9B

IMAGE PROCESSING APPARATUS AND IMAGE PROCESSING METHOD

CROSS REFERENCE TO RELATED APPLICATION

This application claims priority to and the benefit of Japanese Patent Application No. 2013-170756 (filed on Aug. 20, 2013), the entire contents of which are incorporated herein by reference.

TECHNICAL FIELD

This disclosure relates to an image processing apparatus and an image processing method those for improving image quality by sharpening an image and, more specifically, to an image processing apparatus and an image processing method those suitable for sharpening a video displayed by enlarging an original image signal.

BACKGROUND

When a full high-definition television (HDTV: High Definition Television, 1080×1920 pixels) receiver enlarges an image signal with resolution lower than that for the HDTV and displays an image thus obtained, the image becomes blurry. Similarly, when an image represented by an image signal with resolution for the HDTV is enlarged to an image with higher resolution (for example, 4K resolution of approximately 4000×2000 pixels), the image becomes blurry. As such, a conventional television receiver performs contour compensation for sharpening rise and fall of a video signal corresponding to an outline portion of an image to be displayed. In contour compensation, a high frequency component of an input image signal (a luminance signal) is extracted, amplified, and then added to the input image signal, thereby improving visual image quality.

However, conventional image enhancement processing is based on linear digital signal processing and thus incapable of generating a frequency component higher than a Nyquist frequency, i.e., a frequency component higher than ½ of a sampling frequency of a subject image. Therefore, for improvement in image quality, image sharpening by generating and using the frequency component exceeding the Nyquist frequency cannot be carried out.

The following is a description of a change in a frequency component by enlargement and enhancement processing of the image, with reference to FIG. 14. FIG. 14A illustrates a frequency spectrum of a digital image signal with a sampling frequency fs, and FIG. 14B illustrates a frequency spectrum when the digital image signal is up-converted and the number of pixels thereof is doubled in the horizontal direction. A new sampling frequency Fbs obtained through the enlargement processing doubles the original sampling frequency fs (Fbs=2·fs). Here, as illustrated in FIG. 14B, in the up-converted digital image signal, there is no frequency component between fs/2 corresponding to the Nyquist frequency of the original sampling frequency fs, and Fbs/2=fs corresponding to the new Nyquist frequency of the new sampling frequency Fbs.

FIG. 14C illustrates a frequency spectrum when, on the up-converted digital image signal, image enhancement processing employing conventional linear digital signal processing is carried out. As illustrated in the figure, due to the image enhancement processing employing the linear digital signal processing, frequency components near the original Nyquist frequency fs/2 are increased. However, the image enhancement processing employing the conventional linear digital signal processing does not generate the frequency component exceeding the original Nyquist frequency fs/2. That is, with the up-converted digital image signal, in order to improve the image quality, image sharpening by generating and using the frequency component exceeding the Nyquist frequency cannot be carried out.

As such, it has been suggested sharpening processing for generating a high-range frequency component exceeding the Nyquist frequency by nonlinear arithmetic processing (PLT 1). This sharpening processing extracts a high frequency component of an input image signal (a luminance signal) and processes the high frequency component by using a nonlinear function, thereby generating a new frequency component that does not exist in an original input image signal. This processing, as illustrated in FIG. 14D by way of example, may generate a frequency component near the new Nyquist frequency Fbs/2 exceeding the original Nyquist frequency fs/2.

However, there has been a problem that, when this sharpening processing is applied to a two-dimensional image, that is, when this sharpening processing is carried out on high frequency components in the horizontal direction and the vertical direction of the image, a phenomenon in which a diagonal line glitters occurs in an image obtained by the sharpening processing.

FIG. 15 is a diagram illustrating a configuration for consecutively performing, in the vertical direction and the horizontal direction, the sharpening processing for generating the high-range frequency component exceeding the Nyquist frequency. FIG. 16 are diagrams illustrating a frequency component of a signal at each stage. FIG. 16A illustrates a frequency component of an input image signal $S_{in}$ of a digital image with a sampling frequency fh in the horizontal direction and a sampling frequency fv in the horizontal direction. The digital image has a Nyquist frequency fh/2 in the horizontal direction and a Nyquist frequency fv/2 in the vertical direction and, as illustrated in the figure, there is no frequency component in a range exceeding the Nyquist frequency. When the sharpening processing is carried out on the input image signal $S_{in}$ in the vertical direction, in a signal S1 thus obtained, as illustrated in FIG. 16B, the frequency component is generated in a wide range exceeding the Nyquist frequency fv/2 in the vertical direction. When the sharpening processing is further carried out on the signal S1 in the horizontal direction, in an output image signal $S_{out}$ thus obtained, as illustrated in FIG. 16C, the frequency component is generated in a wide range exceeding the Nyquist frequency fh/2 in the horizontal direction. As illustrated in the figure, regions at four corners of the frequency component of the output image signal $S_{out}$, i.e., regions at high frequencies in both the horizontal direction and the vertical direction are subjected to the sharpening processing in the horizontal direction and the vertical direction in an overlapping manner, whereby the glitter of the image is emphasized.

In order to clear such glitter, a technique for providing a two-dimensional filter at a preceding stage of horizontal direction sharpening processing and vertical direction sharpening processing has been proposed (see PLT 2).

The PLT 2, as illustrated in FIG. 17, provides the two-dimensional filter at a preceding stage of the horizontal direction sharpening processing and the vertical direction sharpening processing. FIG. 18 is a diagram illustrating an example of frequency characteristics of the two-dimensional filter. As illustrated in the figure, the two-dimensional filter is characteristic in attenuating high frequency components in the horizontal direction and the vertical direction of the input image signal $S_{in}$.

The output image signal $S_{out}$ generated by a circuit in FIG. 17 is less deteriorated than a signal in FIG. 16C. However, since in a region at high frequencies in both the horizontal direction and the vertical direction a harmonic is further generated in the vertical direction to a signal in which a harmonic is generated in the horizontal direction, there is a problem that an image is still likely to become glistening/flickering. Also, in order to clear the glittering/flickering, when a passage region of the two-dimensional filter is set to be narrow, the signal components subjected to the sharpening is reduced, causing a problem that effective sharpening is prohibited.

As such, we have already suggested an image processing apparatus and an image processing method capable of sharpening an image without generating a frequency component caused by the sharpening processing in the horizontal direction and the vertical direction in an overlapping manner in a frequency domain exceeding both frequency components in the horizontal direction and the vertical direction of the input image.

That is, our preceding Japanese patent application No. 2013-035186 suggests an image processing apparatus, as illustrated in FIG. 19 and FIG. 20, for sharpening the input image by generating a frequency component higher than the frequency component contained in the input image signal representing the input image, the image processing apparatus including: a vertical filter (or a two-dimensional filter) for removing a high frequency portion of a frequency component in the vertical direction of the input image signal from at least a high frequency portion in the horizontal direction contained in the input image signal; a horizontal sharpening processing unit FEh for generating a harmonic in the horizontal direction containing a frequency component higher than a frequency component in the horizontal direction contained in the input image signal; a horizontal filter (or the two-dimensional filter) for removing a high frequency portion of a frequency component in the horizontal direction of the input image signal from at least a high frequency portion in the vertical direction contained in the input image signal; and a vertical sharpening processing unit FEv for generating a harmonic in the vertical direction containing a frequency component higher than a frequency component in the vertical direction contained in the input image signal, wherein a horizontal direction processing unit in which the vertical filter is disposed at a preceding stage of the horizontal sharpening processing unit FEh and a vertical direction processing unit in which the horizontal filter is disposed at a preceding stage of the vertical sharpening processing unit FEv are connected in series (FIG. 19) or in parallel (FIG. 20).

As illustrated in FIG. 21, further, we have suggested that an amplifier (an amplification factor β satisfies 0≤β≤1) connected to a subsequent stage of one of the horizontal direction processing unit and the vertical direction processing unit, which are connected in parallel, and also to a preceding stage of the other.

As a variation of the image processing apparatus in FIG. 21, also, as illustrated in FIG. 22, the horizontal direction processing unit in which the two-dimensional LPF (a horizontal filter) is disposed at a preceding stage of the horizontal sharpening processing unit FEh and the vertical direction processing unit in which the two-dimensional LPF (a vertical filter) is disposed at a preceding stage of the vertical sharpening processing unit FEv are connected to each other in parallel, and the amplifier (note that the amplification factor β satisfies 0≤β≤1) may be connected to a subsequent stage of one of the horizontal sharpening processing unit FEh and the vertical sharpening processing unit FEv and also to a preceding stage of the other (between the other sharpening processing unit and the two-dimensional LPF).

Note that the two-dimensional LPF (the horizontal filter) and the two-dimensional LPF (the vertical filter) has characteristics as illustrated in FIG. 23A and FIG. 23B, respectively. The two-dimensional LPF (the horizontal filter) in FIG. 23A is "a filter for removing a high frequency portion of a frequency component in the vertical direction of the input image signal from at least a high frequency component in the horizontal direction contained in the input image signal" and has characteristics similar to that of the vertical LPF. On the other hand, the two-dimensional LPF (the vertical filter) in FIG. 23A is "a filter for removing a high frequency portion of a frequency component in the horizontal direction of the input image signal from at least a high frequency component in the vertical direction contained in the input image signal" and has characteristics similar to that of the horizontal LPF.

CITATION LIST

Patent Literatures

PLT 1: WO2010/140281
PLT 2: WO2012/043407

SUMMARY

Technical Problem

In carrying out the image sharpening processing as described above on an image to be displayed by enlarging an original image signal, what is generally and conventionally carried out is increasing the number of pixels by up-converting the input image (processing for increasing the number of pixels by employing an interpolation technique or the like) and then carrying out sharpening processing for adding a high frequency component that is not contained in an original signal by using an image signal processing apparatus (an apparatus including a filter and a sharpening processing unit) (see the PLT 2).

For example, in order to carry out the sharpening processing in FIG. 22 as described above on the enlarged image, it has been considered to immediately up-convert the input signal as illustrated in FIG. 24. This circuit needs only one up-converter (an arithmetic unit for carrying out up-conversion processing) and thus is simple. However, in actual circuit designing, designing the up-converter and the filter uses a large number of logic elements such as multipliers and, when arithmetic processing becomes more complex, a circuit scale becomes larger. For example, in a circuit in FIG. 24, the up-converter for up-converting in the horizontal direction and the vertical direction needs 4 multipliers (2 multipliers for each processing in the horizontal direction and processing in the vertical direction), and each of 2 two-dimensional LPFs (15×15 tap) for the up-converted image needs 64 multipliers. Therefore, at the stage of the filter processing before the sharpening processing, as many as 132 (64×2+4) multipliers are necessary, which enlarges the circuit scale.

Previously, also, it has never been examined about which stage in overall arithmetic is appropriate for the up-converter to carry out the image enlargement processing on the image, from the viewpoint of the circuit designing.

Accordingly, it could be helpful, in consideration of the above problem, to provide a small and high-performance image processing apparatus and image processing method those having the up-converter and the filters that are appropriately arranged and also having a small circuit scale and thus reducing cost.

Solution to Problem

In order to solve the above problem, a basic feature of an image processing apparatus of the disclosure herein is an image processing apparatus for generating an output image by up-converting an input image and sharpening an image, the image processing apparatus includes:

a path on a base image side for generating a first signal having an increased number of pixels by up-converting an input image signal representing the input image;

a path on a sharpening processing side for generating a second signal for sharpening the input image by a sharpening processing unit having a nonlinear arithmetic unit configured to generate a frequency component higher than a frequency component contained in the input image signal representing the input image; and an adder configured to generate an output image signal representing the output image by combining the first signal and the second signal, wherein at a subsequent stage of at least one filter in the path on the sharpening processing side, the up-converter is disposed, followed by the nonlinear arithmetic unit.

Further, the sharpening processing unit includes at least one of a first-configuration sharpening processing unit having: a filter unit configured to generate a first high frequency signal by removing at least a DC component of a frequency component contained in an input signal to the sharpening processing unit; the nonlinear arithmetic unit configured to generate a second high frequency signal by carrying out, on the first high frequency signal, nonlinear arithmetic processing that is asymmetric between a positive region and a negative region of the first high frequency signal, the nonlinear arithmetic processing applied to the positive region of the first high frequency signal and the nonlinear arithmetic processing applied to the negative region of the first high frequency signal being represented by a continuous function that passes through an origin, such that a band of frequency components generated by the nonlinear arithmetic processing has asymmetric frequency ranges between the positive region and the negative region; and a limiter configured to generate a sharpening processing unit output signal by adjusting the second high frequency signal, and a second-configuration sharpening processing unit having: a nonlinear arithmetic unit configured to generate a third high frequency signal by carrying out nonlinear arithmetic processing on an input signal to the sharpening processing unit, the nonlinear arithmetic processing carried out on the input signal such that the third high frequency signal is represented by a continuous nonlinear function and a frequency component not contained in the input signal is generated; a filter unit configured to generate a fourth high frequency signal by removing at least a DC component of a frequency component contained in the third high frequency signal; and a limiter configured to generate a sharpening processing unit output signal by adjusting the fourth high frequency signal.

The image processing apparatus having basic characteristics as described above or characteristics of the sharpening processing unit as described above may further have a configuration as described below.

Preferably, the path on the base image side has a first up-converter, the path of the sharpening processing side has:

a vertical filter configured to remove a high frequency portion of a frequency component in a vertical direction of the input image signal from at least a high frequency portion in a horizontal direction contained in the input image signal;

a second up-converter configured to up-convert an output of the vertical filter;

a horizontal sharpening processing unit configured to generate a harmonic in the horizontal direction containing a frequency component higher than a frequency component in the horizontal direction contained in the input image signal;

a horizontal filter configured to remove a high frequency portion of a frequency component in a horizontal direction of the input image signal from at least a high frequency portion in the vertical direction contained in the input image signal;

a third up-converter configured to up-convert an output of the horizontal filter; and a vertical sharpening processing unit configured to generate a harmonic in the vertical direction containing a frequency component higher than a frequency component in the vertical direction contained in the input image signal, and a horizontal direction processing unit having the vertical filter, the second up-converter, and the horizontal sharpening processing unit arranged in the stated order and a vertical direction processing unit having the horizontal filter, the third up-converter, and the vertical sharpening processing unit arranged in the stated order are connected in parallel.

Preferably, the image processing apparatus includes an amplifier connected to a subsequent stage of one of the horizontal sharpening processing unit and the vertical sharpening processing unit and also to a preceding state of the other.

Preferably, an amplification factor f3 of the amplifier satisfies $0 \leq \beta \leq 1$.

Preferably, the path on the base image side has a first up-converter, the path of the sharpening processing side has:

a two-dimensional filter configured to remove at least a high frequency portion of frequency components in the horizontal direction and the vertical direction contained in the input image signal;

a second up-converter configured to up-convert an output of the two-dimensional filter;

a horizontal sharpening processing unit configured to generate a harmonic in the horizontal direction containing a frequency component higher than a frequency component in the horizontal direction contained in the input image signal; and a vertical sharpening processing unit configured to generate a harmonic in the vertical direction containing a frequency component higher than a frequency component in the vertical direction contained in the input image signal, and the two-dimensional filter, the second up-converter, a parallel circuit of the horizontal sharpening processing unit and the vertical sharpening processing unit are connected in the stated order.

Preferably, the image processing apparatus includes an amplifier connected to a subsequent stage of one of the horizontal sharpening processing unit and the vertical sharpening processing unit and also to a preceding state of the other.

Preferably, an amplification factor β of the amplifier satisfies 0≤β≤1.

Preferably, the path on the base image side has a first up-converter, the path on the sharpening processing side has:

a horizontal high pass filter configured to remove at least a DC component of a frequency component in the horizontal direction;

a second up-converter configured to up-convert an output of the horizontal high pass filter;

a first nonlinear arithmetic unit configured to generate a harmonic in the horizontal direction containing a frequency component higher than a frequency component in the horizontal direction contained in the input image signal;

a vertical high pass filter configured to remove at least a DC component of a frequency component in the vertical direction;

a third up-converter configured to up-convert an output of the vertical high pass filter; and a second nonlinear arithmetic unit configured to generate a harmonic in the vertical direction containing a frequency component higher than a frequency component in the vertical direction contained in the input image signal, and a horizontal direction sharpening processing unit having the horizontal high pass filter, the second up-converter, and the first nonlinear arithmetic unit arranged in the stated order and a vertical direction sharpening processing unit having the vertical high pass filter, the third up-converter, and the second nonlinear arithmetic unit arranged in the stated order are connected in parallel.

Preferably, the horizontal direction sharpening processing unit further has the limiter at a subsequent stage of the first nonlinear arithmetic unit, and the vertical direction sharpening processing unit further has the limiter at a subsequent stage of the second nonlinear arithmetic unit.

Preferably, the path on the sharpening processing side further has:

a vertical filter configured to remove a high frequency portion of a frequency component in the vertical direction of the input image signal from at least a high frequency portion in the horizontal direction contained in the input image signal; and a horizontal filter configured to remove a high frequency portion of a frequency component in the horizontal direction of the input image signal from at least a high frequency portion in the vertical direction contained in the input image signal, the vertical filter is disposed at a preceding stage of the horizontal direction sharpening processing unit, and the horizontal filter is disposed at a preceding stage of the vertical direction sharpening processing unit.

Preferably, the path on the sharpening processing side further has a two-dimensional filter configured to remove at least a high frequency portion of the frequency components in the horizontal direction and the vertical direction contained in the input image signal, and at a subsequent stage of the two-dimensional filter, the horizontal direction sharpening processing unit and the vertical direction sharpening processing unit are connected in parallel.

Preferably, the path on the base image side has a first up-converter, the path on the sharpening processing side has at least:

a two-dimensional high pass filter configured to remove at least a DC component of the frequency components in the horizontal direction and the vertical direction;

a second up-converter configured to up-convert an output of the two-dimensional high pass filter; and a nonlinear arithmetic unit configured to generate simultaneously a harmonic in the horizontal direction containing a frequency component higher than a frequency component in the horizontal direction contained in the input image signal and a harmonic in the vertical direction containing a frequency component higher than a frequency component in the vertical direction contained in the input image signal, and the two-dimensional high pass filter, the second up-converter, and the nonlinear arithmetic unit are connected in the stated order.

Preferably, the path on the sharpening processing side further has a limiter at a subsequent stage of the nonlinear arithmetic unit.

Preferably, the path on the sharpening processing side further has, at a preceding stage of the two-dimensional high pass filter, a two-dimensional low pass filter configured to remove at least a high frequency portion of the frequency components in the horizontal direction and the vertical direction contained in the input image signal.

In order to solve the above problem, a basic feature of an image processing method of the disclosure herein is an image processing method of an image processing apparatus for generating an output image by up-converting an input image and sharpening an image, the image processing method includes:

a step of generating a first signal having an increased number of pixels by up-converting an input image signal representing the input image;

a step of generating a second signal for sharpening the input image by carrying out sharpening processing having nonlinear arithmetic processing for generating a frequency component higher than a frequency component contained in the input image signal representing the input image; and a step of generating an output image signal representing the output image by combining the first signal and the second signal, wherein at the step of generating the second signal, after at least one filter processing, up-conversion is carried out, followed by the nonlinear arithmetic processing.

Further, the sharpening processing carries out at least one of:

a first-configuration sharpening processing having: a step of generating a first high frequency signal by removing at least a DC component of a frequency component contained in an input signal to a sharpening processing unit; a nonlinear arithmetic processing step of generating a second high frequency signal by carrying out, on the first high frequency signal, nonlinear arithmetic processing that is asymmetric between a positive region and a negative region of the first high frequency signal, the nonlinear arithmetic processing applied to the positive region of the first high frequency signal and the nonlinear arithmetic processing applied to the negative region of the first high frequency signal being represented by a continuous function that passes through an origin, such that a band of frequency components generated by the nonlinear arithmetic processing has asymmetric frequency ranges between the positive region and the negative region; and a step of generating a sharpening processing unit output signal by adjusting the second high frequency signal, and a second-configuration sharpening processing having: a nonlinear arithmetic processing step of generating a third high frequency signal by carrying out the nonlinear arithmetic processing on an input signal to the sharpening processing unit, such that the third high frequency signal is represented by a continuous nonlinear function and a frequency component not contained in the input signal is generated; a step of generating a fourth high frequency signal by removing at least a DC component of a frequency component contained in the third high frequency signal; and a step of generating a sharpening processing unit output signal by adjusting the fourth high frequency signal.

The image processing method having basic characteristics as described above or characteristics of the sharpening processing as described above may further have a configuration as described below.

Preferably, the step of generating the first signal has a step of carrying out first up-conversion, and the step of generating the second signal has:

a horizontal direction processing step of removing a high frequency portion of a frequency component in a vertical direction of the input image signal from at least a high frequency portion in a horizontal direction contained in the input image signal, carrying out second up-conversion, and then carrying out horizontal direction sharpening processing for generating a harmonic in the horizontal direction containing a frequency component higher than a frequency component in the horizontal direction contained in the input image signal; and a vertical direction processing step of removing a high frequency component of a frequency component in the horizontal direction of the input image signal from at least a high frequency portion in the vertical direction contained in the input image signal, carrying out third up-conversion, and then carrying out vertical direction sharpening processing for generating a harmonic in the vertical direction containing a frequency component higher than a frequency component in the vertical direction contained in the input image signal, and the horizontal direction processing step and the vertical direction processing step are executed in parallel.

Preferably, the image processing method includes a step of changing, based on an amplification factor $\beta$, between serial execution and parallel execution of the horizontal sharpening processing and the vertical sharpening processing.

Preferably, the amplification factor $\beta$ satisfies $0 \leq \beta \leq 1$.

Preferably, the step of generating the first signal has a step of carrying out first up-conversion, and the step of generating the second signal removes at least a high frequency portion of frequency components in the horizontal direction and the vertical direction contained in the input image signal, carries out second up-conversion, and then carries out parallel execution of the horizontal sharpening processing for generating a harmonic in the horizontal direction containing a frequency component higher than a frequency component in the horizontal direction contained in the input image signal and the vertical sharpening processing for generating a harmonic in the vertical direction containing a frequency component higher than a frequency component in the vertical direction contained in the input image signal.

Preferably, the image processing method includes a step of changing, based on an amplification factor $\beta$, between serial execution and parallel execution of the horizontal sharpening processing and the vertical sharpening processing.

Preferably, the amplification factor $\beta$ satisfies $0 \leq \beta \leq 1$.

Preferably, the step of generating the first signal has a step of carrying out first up-conversion, the step of generating the second signal has:

a horizontal direction sharpening processing step of removing at least a DC component of a frequency component in the horizontal direction, carrying out second up-conversion, and then carrying out first nonlinear arithmetic processing for generating a harmonic in the horizontal direction containing a frequency component higher than a frequency component in the horizontal direction contained in the input image signal; and a vertical direction sharpening processing step of removing at least a DC component of a frequency component in the vertical direction, carrying out third up-conversion, and then carrying out second nonlinear arithmetic processing for generating a harmonic in the vertical direction containing a frequency component higher than a frequency component in the vertical direction contained in the input image signal, and the horizontal direction sharpening processing step and the vertical direction sharpening processing step are carried out in parallel.

Preferably, the horizontal direction sharpening processing step further has limiter processing after the first nonlinear arithmetic processing, and the vertical direction sharpening processing step further has limiter processing after the second nonlinear arithmetic processing.

Preferably, the step of generating the second signal further has:

before the horizontal direction sharpening processing, a step of removing a high frequency portion of a frequency component in the vertical direction of the input image signal from at least a high frequency portion in the horizontal direction contained in the input image signal; and before the vertical direction sharpening processing, a step of removing a high frequency portion of a frequency component in the horizontal direction of the input image signal from at least a high frequency portion in the vertical direction contained in the input image signal.

Preferably, the step of generating the second signal further has a step of removing at least a high frequency portion of the frequency components in the horizontal direction and the vertical direction contained in the input image signal, and then executes the horizontal direction sharpening processing step and the vertical direction sharpening processing step in parallel.

Preferably, the step of generating the first signal has a step of carrying out first up-conversion, and the step of generating the second signal removes at least a DC component of the frequency components in the horizontal direction and the vertical direction, carries out second up-conversion, and then carries out nonlinear arithmetic processing for simultaneously generating a harmonic in the horizontal direction containing a frequency component higher than a frequency component in the horizontal direction contained in the input image signal and a harmonic in the vertical direction containing a frequency component higher than a frequency component in the vertical direction contained in the input image signal.

Preferably, the step of generating the second signal further has limiter processing after the nonlinear arithmetic processing.

Preferably, the step of generating the second signal further has a step of removing, before removing at least DC components of the frequency components in the horizontal direction and the vertical direction, at least a high frequency portion of the frequency components in the horizontal direction and the vertical direction contained in the input image signal.

Advantageous Effect

Our image processing apparatus and image processing method are capable of, as compared to filter processing after up-converting the input image, significantly reducing the number of multipliers used for the filters by up-converting the image after the filter processing. Further, the disclosure herein may substantialize a small and high performance image processing apparatus that may downsize an overall image processing circuit scale and reduce cost.

As being capable of compensating in a high frequency domain exceeding a Nyquist frequency, our image processing apparatus and image processing method have a great advantage as being capable of sufficiently sharpening a video being displayed in real time with a simple configuration, such as when a display of a high definition television (HDTV) receiver displays an image by carrying out enlargement processing on the image signal of a standard definition television (SDTV) and when the image signal of the HDTV is up-converted so as to be displayed in a 4K display.

BRIEF DESCRIPTION OF THE DRAWINGS

In the accompanying drawings:

FIGS. 2A to 2D are diagrams illustrating a waveform of a signal level in a horizontal direction in association with sharpening processing;

FIG. 6 is a diagram illustrating a configuration of an image processing apparatus according to a first embodiment;

FIGS. 8A and 8B are diagrams illustrating a configuration of an image processing apparatus according to a third embodiment;

FIGS. 9A and 9B are diagrams illustrating a configuration of an image processing apparatus according to a fourth embodiment;

DETAILED DESCRIPTION

Hereinafter, embodiments of the disclosure herein will be described in detail with reference to the accompanying drawings.

An image processing apparatus (an integrated circuit) according to each embodiment, schematically speaking, is an apparatus for carrying out filter processing on an input image signal, up-conversion processing, and then sharpening processing for sharpening an image on a frequency component in a horizontal direction (a transverse direction, a main scanning direction) of the image and a frequency component in a vertical direction (a longitudinal direction, a sub-scanning direction).

The sharpening processing carried out by the image processing apparatus is an operation for carrying out non-linear arithmetic processing on a signal representing an input image (hereinafter, referred to as an input image signal), thereby sharpening (enhancing) rise and fall of a signal corresponding to an outline portion (an edge) contained in the input image. The sharpening processing carried out by the image processing apparatus is capable of adding, to an image signal, a high frequency component which cannot be used by conventional sharpening processing that employs linear processing such as amplification processing and the like, thereby highly (intensely) sharpening the image.

First, an outline of a sharpening processing unit, which is a main element of the image processing apparatus according to each embodiment described later, will be described. Note that the sharpening processing unit may be either one of a horizontal sharpening processing unit and a vertical sharpening processing unit described later. A term "sharpening processing unit" will be used herein when it is not necessary to distinguish between the horizontal sharpening processing unit and the vertical sharpening processing unit.

(Example of First Configuration of Sharpening Processing Unit)

Figure 1:
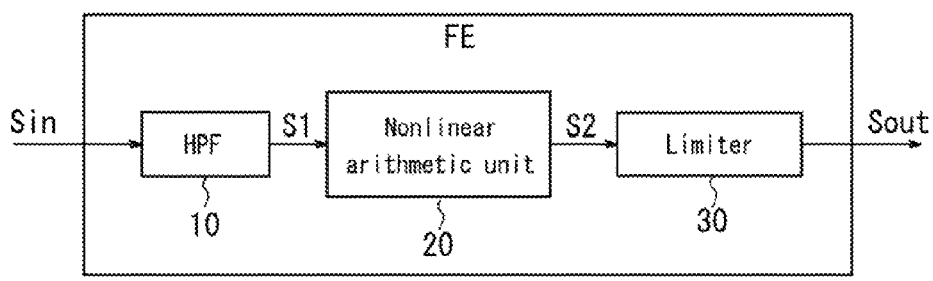
FIG. 1 is a diagram illustrating a first configuration of a sharpening processing unit of the disclosure herein.

First, the sharpening processing used herein will be described. FIG. 1 is a block diagram illustrating an example of a first configuration of a sharpening processing unit FE of the disclosure herein. The sharpening processing unit FE carries out, on an input image signal $S_{in}$ that is externally input and serves as a digital signal representing an image, processing for sharpening the image represented by the input image signal $S_{in}$. The sharpening processing unit FE includes a HPF (High Pass Filter) 10, a nonlinear arithmetic unit 20 (a nonlinear function), and a limiter 30.

The image represented by the input image signal $S_{in}$ may be either a still image or a video. When the input image signal $S_{in}$ represents the video, the video may be displayed in real time in, for example, a standard definition television (SDTV: Standard Definition Television) receiver or a high definition television (HDTV: High Definition Television) receiver. The disclosure herein especially targets the input image signal Sm that is up-converted.

Hereinafter, by using a horizontal direction waveform of a signal level (a luminance value) of the image illustrated in FIG. 2 by way of example, an operation of each element and a waveform output therefrom will be described. Note that, although herein each element will be described in association with the horizontal direction waveform of the signal level of the image, the sharpening processing similar to that for the horizontal direction waveform of the signal level may be carried out also on an a vertical direction waveform of the signal level of the image and a waveform of a signal level in a time direction between images of the video.

FIG. 2A is a diagram illustrating the horizontal direction waveform of the signal level of the input image signal $S_{in}$, especially illustrating a portion of the waveform corresponding to the edge where the signal level changes in the horizontal direction. Note that resolution of the input image signal $S_{in}$ corresponds to that of an output image signal $S_{out}$. Therefore, when the resolution of an output image is higher than that of the input image originally input, it means that the input image signal $S_{in}$ is up-converted to have the resolution of the output image signal $S_{out}$. For example, when the image processing apparatus outputs an image of the SDTV as an image of the HDTV, the input image signal $S_{in}$ is converted to have the resolution of the HDTV by existing linear conversion carried out on the input image signal $S_{in}$ of the original image of the SDTV.

The HPF 10 removes at least a DC component of a frequency component contained in the input image signal $S_{in}$, and thus generates a first signal, which is a high frequency signal. In particular, the HPF 10 extracts a high frequency component containing an edge component of the image represented by the input image signal $S_{in}$ and also extracts a first signal S1 of FIG. 2B from the input image signal $S_{in}$ of FIG. 2A.

Figure 3:
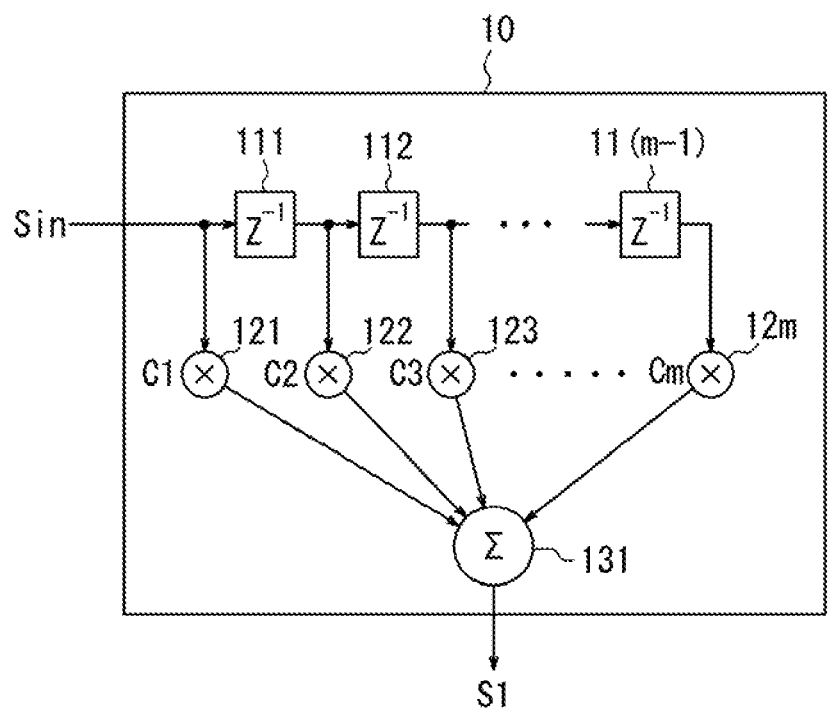
FIG. 3 is a diagram illustrating an example of a configuration of a high pass filter.
Figure 4:
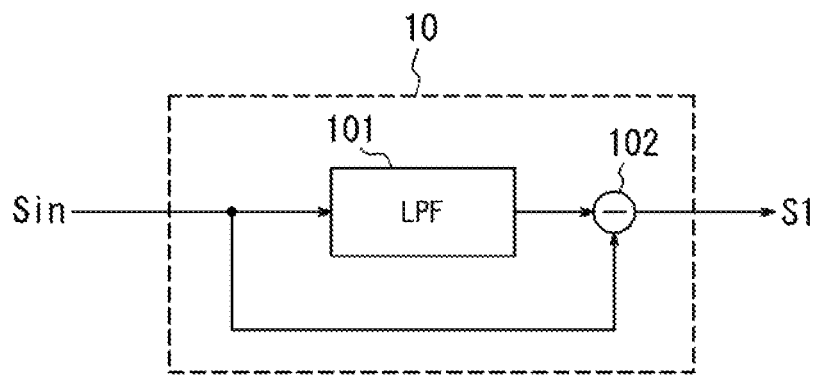
FIG. 4 is a diagram illustrating an example of the high pass filter configured using a low pass filter.

FIG. 3 is a block diagram illustrating a configuration of the HPF 10. As illustrated in FIG. 3, the HPF 10 may be constituted by using a transversal digital filter having m-number of taps (m is 3 or more) made up of m−1 number of unit delay elements 111 to 11(m−1), m-number of multipliers 121 to 12m, and one adder 131. In this case, each multiplier 12j (j=1 to m, the same applies hereinafter) multiplies the input signal by a coefficient Cj and outputs a result thus obtained to the adder 131. The coefficient Cj is set such that the HPF 10 extracts the high frequency component containing the outline component (for example, m=3, C1=0.5, C2=−1, and C3=0.5). In general, a low pass filter is substantialized more easily than a high pass filter. FIG. 4 is a diagram illustrating an example of the high pass filter configured using the low pass filter. As illustrated in FIG. 4, the HPF 10 illustrated in FIG. 1 may be substantialized by using a low pass filter (Low-pass Filter; hereinafter, referred to as an "LPF") 101 and a subtractor 102.

The nonlinear arithmetic unit 20 carries out, on the first signal S1, nonlinear arithmetic processing represented by a continuous nonlinear function such that a second signal S2 passes through the origin, and thereby generates the second signal S2. Although this nonlinear arithmetic processing may use a nonlinear function that is point symmetry with respect to the origin, the second signal S2 generated by carrying out the nonlinear arithmetic processing that is asymmetric in the positive and negative regions of the first signal S1 enables sharpening processing corresponding to the human visual characteristic. The first signal S1, as illustrated in FIG. 2B, includes the edge component in the positive direction and the edge component in the negative direction.

Here, the nonlinear function that is asymmetric in the positive and negative regions will be described. The positive direction and the negative direction of the first signal S1 corresponds to a white direction and a black direction of a pixel, respectively. Applying different (asymmetric) nonlinear arithmetic processing in both directions, rather than the same (symmetric) nonlinear arithmetic processing, allows edge enhancement that is more appropriate for human visual characteristic. That is, the nonlinear arithmetic unit 20 may carry out different (asymmetric) nonlinear arithmetic processing on the edge component in the positive direction of the first signal S1 and the edge component in the negative direction. Hereinafter, the nonlinear arithmetic processing that is asymmetric in the positive direction and the negative direction of the first signal S1 will be particularly referred to as "asymmetric nonlinear arithmetic processing". According to the disclosure herein, the nonlinear arithmetic processing is not limited to the asymmetric nonlinear arithmetic processing; however, the asymmetric nonlinear arithmetic processing, rather than the processing using the nonlinear function that is symmetric with respect to the origin, enables visually natural sharpening processing.

The asymmetric nonlinear arithmetic processing carried out by the nonlinear arithmetic unit 20 may be any combination of nonlinear arithmetic processing as long as a value of the nonlinear arithmetic processing applied to the positive region and a value of the nonlinear arithmetic processing applied to the negative region are continuous around the origin (a point where the value is zero) of the first signal S1. The present embodiment assumes that the nonlinear arithmetic unit 20, for example, generates the second signal S2 by raising the first signal S1 to the third power ($S2=S1^3$) when the first signal S1 is positive and by squaring the first signal S1 and adding a minus sign ($S2=-S1^2$) when the first signal S1 is negative. FIG. 2C is a diagram illustrating a waveform of the second signal S2 subjected to the asymmetric nonlinear arithmetic processing carried out by the nonlinear arithmetic unit 20. As illustrated in the figure, the waveform in the positive region of the second signal S2 is significantly amplified.

As described later, also, when the nonlinear arithmetic processing that is asymmetric in the positive region and the negative region of the first signal S1 is carried out, a frequency component that is asymmetric in the positive region and the negative region of the first signal S1 may be generated.

When the nonlinear arithmetic unit 20 carries out the nonlinear arithmetic processing that is asymmetric in the positive direction and the negative direction of the first signal S1, the image sharpening processing that matches human perception characteristics as described later may be substantialized. For example, Weber-Fechner law is known as a law based on the human sense. When this law is applied to image recognition, it can be said that an outline in a low luminance region (luminosity change) may be perceived more easily than an outline in a high luminance region. Therefore, the nonlinear arithmetic unit 20, for example, by carrying out processing having small amplification in the negative region of the first signal S1 on a region with a low signal level (luminance), may appropriately emphasize the edge component of the first signal S1 to allow perception of the outline, while suppressing noise in the low luminance region. Also, since the nonlinear arithmetic unit 20 significantly amplifies the waveform in the positive region such that the outline in the high luminance region is more sharpened, even when the edge component is very small before the nonlinear arithmetic processing, the outline in the high luminance region may be easily perceived. In both regions, further, a high frequency component may be generated by the nonlinear arithmetic processing.

Note that the asymmetric nonlinear arithmetic processing carried out by the nonlinear arithmetic unit 20 is not limited to a combination of the square processing and the cube processing but may be nonlinear arithmetic processing of another type. For example, the nonlinear arithmetic processing carried out in the positive region and the negative region of the first signal S1 may be expressed by Formula (1). The nonlinear arithmetic processing carried out by each arithmetic unit includes all of exponential multipliers of a general rational number represented by p/q. In such exponentiation arithmetic processing, whether the first signal S1 is positive or negative is to be maintained; for example, when even powers (e.g., square) is carried out as the exponentiation arithmetic processing and the first signal S1 is negative, the sign of a value obtained from the exponentiation arithmetic processing is maintained as negative (for example, S2=−S1$^2$).

[Formula 1]

$$S2 = S1^{\frac{p}{q}} \quad (1)$$

Also, the nonlinear arithmetic unit 20, for the asymmetric nonlinear arithmetic processing, may use any appropriate combination of various nonlinear functions such as a trigonometric function (e.g., S2=Sin(S1)), a logarithmic function (e.g., S2=log(|S1|+1)), and a gamma correction function (e.g., S2=S1$^{1/2}$).

Further, the nonlinear arithmetic unit 20 may carry out the nonlinear arithmetic processing that does not use the general formula shown in Formula (1). For example, the nonlinear arithmetic unit 20 may preliminarily hold a table and the like of an addition value for each signal level of the first signal Si and, for an 8-bit signal level that takes a value between a minimum value 0 and a maximum value 255, add a value within a range of ±10 according to the signal level of the first signal S1.

The limiter 30 functions as a regulator of the amplitude (the signal level) of the second signal S2 and, by adjusting the second signal S2, outputs the output image signal $S_{out}$. In particular, the limiter 30 carries out clipping for limiting the amplitude of the second signal S2 within a predetermined upper limit value, or gain adjustment of the level of the second signal S2 by multiplying the second signal S2 by a gain α (0≤α<1). The limiter 30, for noise removal, may also carry out a rounding operation for rounding off a signal value equal to or lower than a predetermined lower limit value to 0. The limiter 30 carries out the clipping, the gain adjustment, the rounding operation and the like on the second signal S2 and outputs the output image signal $S_{out}$ thus obtained.

An adder (not shown) adds the output image signal $S_{out}$ illustrated in FIG. 2C as a compensation signal used for sharpening the image to the input image signal $S_{in}$ illustrated in FIG. 2A and thus generates a signal illustrated in FIG. 2D. The rise of the edge portion of this signal ($S_{in}+S_{out}$) is sharper than the rise of the edge portion of the input image signal $S_{in}$. That is, an image sharper than the image represented by the input image signal $S_{in}$ may be obtained.

(Example of Second Configuration of Sharpening Processing Unit)

Figure 5:
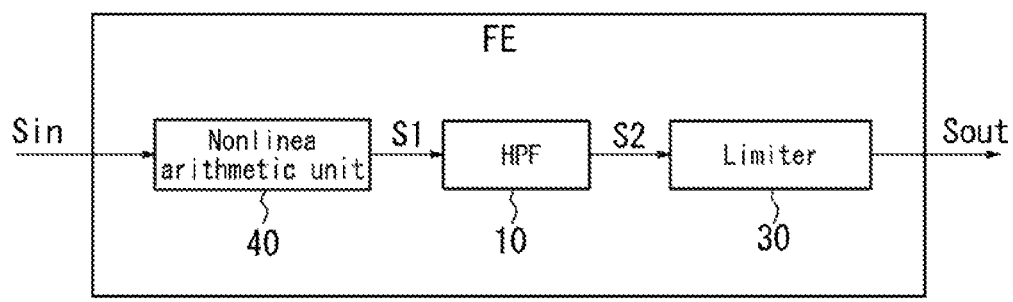
FIG. 5 is a diagram illustrating a second configuration of the sharpening processing unit of the disclosure herein.

FIG. 5 is a block diagram illustrating an example of a second configuration of the sharpening processing unit of the disclosure herein. This sharpening processing unit FE includes a nonlinear arithmetic unit 40 (a nonlinear function), the HPF 10, and the limiter 30. Although in the following description each unit is discussed with respect to a waveform of a signal level in the horizontal direction of the image, each unit may carry out the sharpening processing similar to that for the horizontal direction of the image on a waveform of a signal level in the vertical direction of the image and a waveform of a signal level in a time direction between images of the video.

The nonlinear arithmetic unit 40 carries out the nonlinear arithmetic processing on the input image signal $S_{in}$ such that the first signal S1 is represented by the continuous nonlinear function and thus generates the first signal S1. The nonlinear arithmetic unit 40 carries out the nonlinear arithmetic processing in order to sharpen the outline of the image. The nonlinear arithmetic processing, for example, is processing carried out on the input image signal $S_{in}$ so as to generate the first signal S1 having sharp rise of the edge of the signal level.

The input image signal $S_{in}$ representing the input image contains a DC component which corresponds to the luminance level of the image. The nonlinear arithmetic unit 40 assigns the nonlinear function to the input image signal $S_{in}$ containing the DC component, and may thus simultaneously achieve both generation of a harmonic that is a frequency component not included in the input image signal $S_{in}$ and control of harmonic intensity according to the luminance level of the input image signal $S_{in}$.

The human eyes recognize the DC component of the input image signal $S_{in}$ as "brightness" of the image. When the input image signal $S_{in}$ containing the DC component is subjected to the nonlinear arithmetic processing, since a generation degree of the harmonic differs based on the DC component, a frequency component for image quality improvement may be generated in a manner corresponding to the "brightness" of the image. Therefore, image enhancement processing corresponding to the human visual characteristics may be carried out.

The processing for generating the first signal S1 from the input image signal $S_{in}$ carried out by the nonlinear arithmetic unit 40 may be generalized by Formula (2). The nonlinear arithmetic processing carried out by the nonlinear arithmetic unit 40 includes all of the exponential multipliers of the general rational number represented by p/q.

[Formula 2]

$$S1 = S_{in}^{\frac{p}{q}} \quad (2)$$

For example, the nonlinear arithmetic unit 40 generates the first signal S1 from a power of the input image signal $S_{in}$. When the nonlinear arithmetic unit 40 generates the first signal S1 by raising the input image signal $S_{in}$ to n, $S1=S_{in}^n$ is satisfied. Since the input image signal $S_{in}$ is the digital signal (a discrete signal), when, in particular, a data sequences constituting the input image signal $S_{in}$ is X1, X2, X3, . . . , the first signal S1 is a digital signal composed of a data sequence $X1^n$, $X2^n$, $X3^n$, . . . . Note that the n is any real number.

For example, when the input image signal $S_{in}$ is an 8-bit digital signal, the signal level of each pixel takes a value between 0 and 255. At this time, when the nonlinear arithmetic unit 40 squares the input image signal $S_{in}$, the rise of the edge portion becomes sharp, and the outline of the image becomes more emphasized.

Or, the nonlinear arithmetic unit 40 generates the first signal S1 from, for example, a radical root of the input image signal $S_{in}$. When the nonlinear arithmetic unit 40 generates the first signal S1 from an n-th root of the input image signal $S_{in}$, $S1=S_{in}^{1/n}$ is satisfied. Since the input image signal $S_{in}$ is the digital signal (the discrete signal), when, in particular, the data sequence constituting the input image signal $S_{in}$ is X1, X2, X3, . . . , the first signal S1 is a digital signal composed of a data sequence $X1^{1/n}$, $X2^{1/n}$, $X3^{1/n}$, . . . . Note that the n is any real number.

The nonlinear arithmetic processing for generating the first signal S1 from the radical root of the input image signal $S_{in}$ is suitable for extraction of the outline based on the human perception characteristics. For example, in order to emphasize a very small edge component in the low luminance region so as to allow the perception of the outline, the nonlinear arithmetic unit 40 carries out the nonlinear arithmetic processing using, for example, a gamma correction function (for example, $S1=S_{in}^{1/2}$), thereby increasing the value of pixels with low luminance rather than the value of pixels with high luminance.

In this case, the nonlinear arithmetic unit 40, by using Formula (3), preferably calculates X' that is a value obtained by normalization of a pixel value X of an m-bit digital signal. The X' after the normalization by using the Formula (3) takes a value between 0 and 1.

[Formula 3]

$$X' = \frac{X}{2^m} \quad (3)$$

Here, the nonlinear arithmetic unit 40, by adopting the gamma correction function shown in Formula (4) to the X' after the normalization, calculates a value Y after the nonlinear arithmetic processing.

[Formula 4]

$$Y = X'^{\frac{1}{n}} \quad (5)$$

By the Formula (4), when the X' is small, the value Y after the nonlinear arithmetic processing is increased to be higher than the X'. That is, the value of pixels with low luminance is increased more than the value of pixels with high luminance. Thereby, the edge sharpening increases enhanced edge components particularly in the low luminance region, whereby the outline of the image especially in the low luminance region is more emphasized.

The HPF 10 removes at least the DC component of the frequency component contained in the first signal Si and thus generates the second signal S2 serving as a high frequency signal. In particular, the HPF 10, in operation for extracting the high frequency component containing the outline component of the image obtained through the nonlinear arithmetic processing carried out on the input image signal $S_{in}$, extracts the second signal S2 from the first signal S1.

This sharpening processing unit carries out the nonlinear arithmetic processing on the input image signal $S_{in}$ containing the DC component. Therefore, since an operation central point of the nonlinear arithmetic processing of a signal for generating the harmonic changes according to the luminance level, the generation level of the harmonic changes according to the luminance level. Also, since a nonlinear curve viewed from the operation central point of the nonlinear arithmetic processing differs between a high luminance side and a low luminance side, the harmonic signal that passes through the HPF 10 after subjected to the nonlinear arithmetic processing becomes asymmetric in the positive region and the negative region. Therefore, appropriate sharpening processing corresponding to the human visual characteristics may be carried out.

The limiter 30 functions as an adjuster of amplitude (a signal level) of the second signal S2 and generates the output image signal $S_{out}$ by adjusting the second signal S2. The limiter 30 carries out the clipping, the gain adjustment, the rounding operation and the like on the second signal S2 and outputs the output image signal $S_{out}$ thus obtained.

When the adder (not shown) adds the output image signal $S_{out}$, as the compensation signal used for sharpening the image, to the input image signal $S_{in}$, an image signal subjected to the sharpening processing is generated. The raise of the edge portion of this signal ($S_{in}+S_{out}$) is sharper than the raise of the edge portion of the input image signal $S_{in}$. That is, an image sharper than that represented by the input image signal $S_{in}$ may be obtained.

The following is a detailed description of the image processing apparatus that up-converts the image and includes the sharpening processing unit FE described above for sharpening frequency components in the horizontal direction (a lateral direction, a main scanning direction) and the vertical direction (a longitudinal direction, a sub-scanning direction) of the image. The input image signal $S_{in}$ of each embodiment has the sampling frequency fh in the horizontal direction, the sampling frequency fv in the vertical direction, the Nyquist frequency fh/2 in the horizontal direction, and the Nyquist frequency fv/2 in the vertical direction.

(First Embodiment)

According to a first embodiment, the up-converter is inserted between the LPF for noise removal and the sharpening processing unit. The up-converter used herein is two-dimensional up-converter for up-converting in the horizontal direction and the vertical direction.

EXAMPLE 1

FIG. 6 is a diagram illustrating an image processing apparatus 1 according to Example 1. The image processing apparatus 1 includes a first two-dimensional LPF (a vertical filter) 11 and a second two-dimensional LPF (a horizontal filter) 12 those for noise removal, three up-converters 21, 22 and 23, a horizontal sharpening processing unit FEh, a vertical sharpening processing unit FEv, an amplifier (a switch unit) 31, a first adder 32, a second adder 33, and a third adder 34. In the image processing apparatus 1, the up-converter 21 is disposed between an input and an output of a path of a base image signal. The image processing apparatus 1 also includes a horizontal direction processing unit in which, at a subsequent stage of the first two-dimensional LPF 11, the up-converter 22 is disposed, followed by the horizontal sharpening processing unit FEh, and a vertical direction processing unit in which, at a subsequent stage of the second two-dimensional LPF 12, the up-converter 23 is disposed, followed by the vertical sharpening processing unit FEv. The amplifier 31 serving as the switch unit is connected to an output end of the horizontal sharpening processing unit FEh and an input end of the vertical sharpening processing unit FEv. The amplifier 31, based on a setting thereof (an amplification factor $\beta$), changes between a parallel connection ($\beta=0$) and a series connection ($\beta=1$) of the horizontal direction processing unit and the vertical direction processing unit. Since the amplification factor $\beta$ of the amplifier 31 satisfies $0 \leq \beta \leq 1$, when the amplification factor $\beta$ satisfies $0<\beta<1$, the amplifier 31, rather than strictly changing to one of the parallel connection and the series connection, may have a circuit including both the parallel connection and the series connection.

Figure 23A:
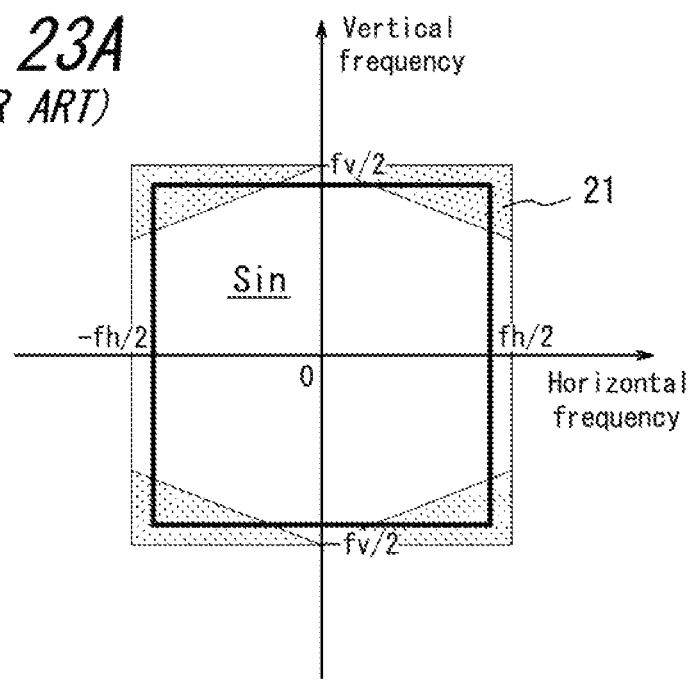
FIGS. 23A and 23B are diagrams illustrating frequency characteristics of a two-dimensional filter (a horizontal filter) and a two-dimensional filter (a vertical filter)

Here, the first two-dimensional LPF (the horizontal filter) 11 and the second two-dimensional LPF (the vertical filter) 12 are characteristic in preventing generation of an unnecessary harmonic during the sharpening processing at a later stage to a signal component that is substantially a noise near limits of the Nyquist frequency at four corners of a two-dimensional frequency spectrum of the input image signal $S_{in}$. The first two-dimensional LPF (the horizontal filter) 11, from at least a high frequency portion in the horizontal direction contained in the input image signal $S_{in}$, removes a high frequency portion of the frequency component in the vertical direction of the input image signal $S_{in}$ and functions as a vertical LPF for partially attenuating a high frequency domain of the vertical direction component of the input image signal $S_{in}$ (see FIG. 23A).

Figure 23B:
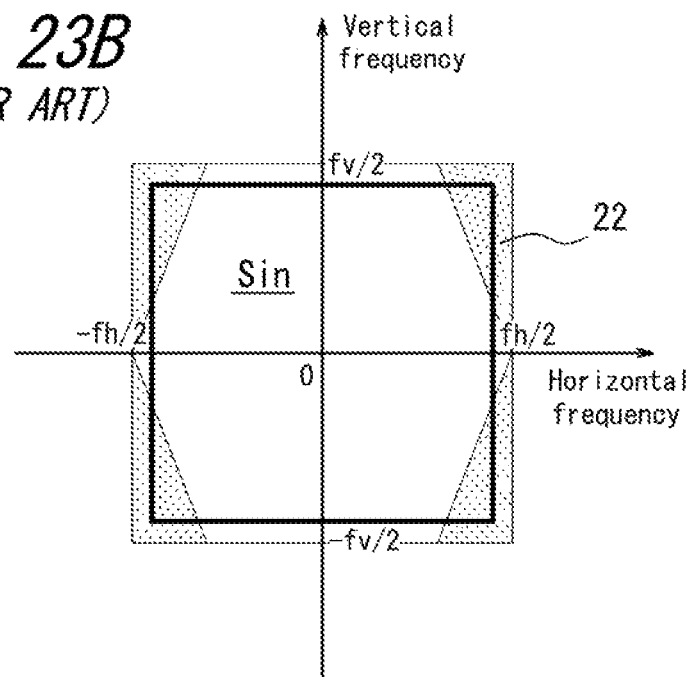

Also, the second two-dimensional LPF (the vertical filter) 12, from at least a high frequency portion in the vertical direction included in the input image signal $S_{in}$, removes a high frequency portion of the frequency component in the horizontal direction of the input image signal $S_{in}$ and functions as the horizontal LPF for partially attenuating a high frequency domain of the horizontal direction component of the input image signal $S_{in}$ (see FIG. 23B). Here, the high frequency portion is a region at high frequencies in both the horizontal direction and the vertical direction that causes the glitter and thus removed or attenuated in order to prevent generation of the high frequency component during the sharpening processing, and may be appropriately set by those who are skilled in the art taking the sharpening characteristics of the sharpening processing units (FEv and FEh) at the subsequent stage of the two-dimensional LPF into consideration.

The input image signal $S_{in}$ corresponding to, for example, a 2K image is input to the up-converter 21 and up-converted into the first signal S1 corresponding to, for example, a 4K image, and then output to the third adder 34. This path corresponds to a path on a base image side for generating the first signal having an increased number of pixels by up-converting the input image signal representing the input image according to the disclosure herein, and the same applies to the examples described below as well.

The first two-dimensional LPF 11 partially attenuates the high frequency domain of the vertical direction component of the input image signal $S_{in}$ and outputs the second signal S2 to the up-converter 22.

The up-converter 22 up-converts the second signal S2 into a third signal S3 corresponding to the 4K image and outputs the third signal S3 to the horizontal sharpening processing unit FEh.

The horizontal sharpening processing unit FEh generates a harmonic in the horizontal direction containing a frequency component higher than the frequency component in the horizontal direction included in the input signal. The horizontal sharpening processing unit FEh carries out the sharpening processing in the horizontal direction of the image represented by the third signal S3 received from the up-converter 22 and outputs a fourth signal S4 thus obtained to the amplifier (the switch unit) 31. The horizontal sharpening processing unit FEh generates the harmonic in the horizontal direction containing a frequency component exceeding the Nyquist frequency in the horizontal direction.

The second two-dimensional filter 12 partially attenuates the high frequency domain of the horizontal direction component of the input image signal $S_{in}$ and outputs a fifth signal S5 thus obtained to the up-converter 23.

The up-converter 23 up-converts the fifth signal S5 into, for example, a sixth signal S6 corresponding to the 4K image and outputs the sixth signal S6 to the first adder 32.

The first adder 32 generates a seventh signal S7 by combining the sixth signal S6 received from the up-converter 23 and a signal obtained by amplifying the fourth signal S4 received from the horizontal sharpening processing unit FEh with the amplification factor $\beta$ of the amplifier (the switch unit) 31.

The vertical sharpening processing unit FEv generates a harmonic in the vertical direction containing a frequency component higher than the frequency component in the vertical direction contained in the input signal. The vertical sharpening processing unit FEv carries out the sharpening processing in the vertical direction of the image represented by the seventh signal S7 received from the first adder 32 and outputs an eighth signal S8 thus obtained to the second adder 33. The vertical sharpening processing unit FEv generates the harmonic in the vertical direction containing a frequency component exceeding the Nyquist frequency in the vertical direction.

The second adder 33 generates a ninth signal S9 by combining the fourth signal S4 received from the horizontal sharpening processing unit FEh and the eighth signal S8 received from the vertical sharpening processing unit FEv.

The third adder 34 generates the output image signal $S_{out}$ by combining the first signal S1 received from the up-converter 21 and the ninth signal S9 received from the second adder 33.

Note that the path from the input end through the sharpening processing (the nonlinear arithmetic processing) of the input image signal $S_{in}$ to the output to the third adder 34 corresponds to a path on a sharpening processing side of the disclosure herein for generating the signal for sharpening the input image by the sharpening processing unit including the nonlinear arithmetic unit for generating the frequency component higher than the frequency component contained in the input image signal representing the input image, and the same applies to the examples described below as well.

Figure 24:
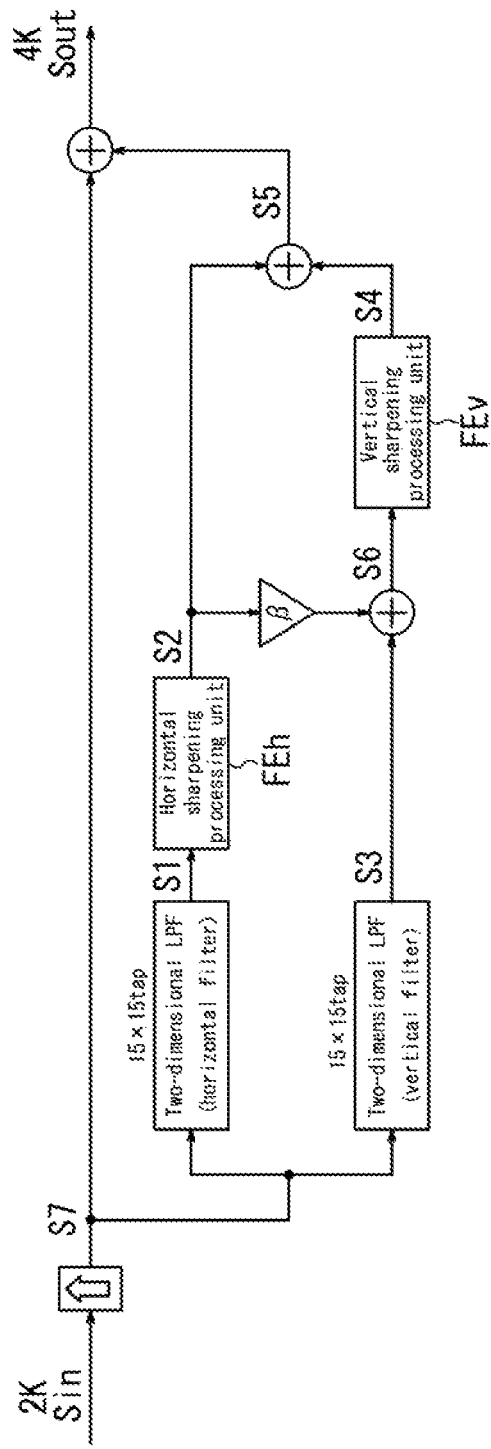
FIG. 24 is a diagram illustrating a configuration in which an up-converter is added to a preceding stage of the image processing apparatus (the switch type).

The image processing apparatus 1 of Example 1, at the stage of filter processing before the sharpening processing, since each of the two two-dimensional LPFs (7×7 tap) for the input image signal $S_{in}$ needs 16 multipliers and 4 multipliers are used for each of the three up-converters, may be constituted by using 44 (16×2+4×3) multipliers in total. Therefore, as compared to an image processing apparatus (having 132 adders in total) in FIG. 24 for up-converting at a preceding stage of the path of the sharpening processing, although the image processing apparatus 1 needs three up-converters, the image processing apparatus 1 may significantly reduce the number of multipliers. Therefore, a significant reduction in size and cost may be achieved.

According to the present embodiment, in addition to the advantage of downsizing a circuit scale, since the two-dimensional LPFs are disposed at preceding stages of the horizontal sharpening processing unit FEh and vertical sharpening processing unit FEv, the image may be sharpened without generating a frequency component caused by the sharpening processing in the horizontal direction and the vertical direction in an overlapping manner in a frequency domain exceeding the frequency component in the horizontal direction and the vertical direction of the input image, thereby reducing the glittering/flickering of the image. Also, since the method of the disclosure herein allows selection of the filters particularly for a band necessary for generation of each horizontal harmonic and vertical harmonic, excellent harmonics each in the horizontal direction and the vertical direction may be obtained without generating a noise, and an image may be sharpened into a clear image.

In the image processing apparatus 1, also, the amplifier 31 serving as the switch unit may change between the series connection and the parallel connection of the horizontal direction processing unit and the vertical direction processing unit.

Therefore, when the amplifier 31 switches to the parallel connection with the amplification factor 0, a total of the high frequency components generated during the sharpening processing in the horizontal direction and the sharpening processing in the vertical direction serves for the image sharpening, preventing generation of artificial glittering. Also, when the amplifier 31 switches to the series connection with the amplification factor 1, even when the image is blur such as when a diagonal portion is already removed from the input image signal $S_{in}$, the high frequency component is two-dimensionally generated in the horizontal direction and the vertical direction. Therefore, the input image may be sharpened into a vivid image.

Also, since in the image processing apparatus 1 the amplifier 31 functions as the switch unit to switch between the series connection and the parallel connection, setting the amplification factor β based on the characteristics of the input image signal $S_{in}$ allows a combination of the frequency components of series processing and parallel processing and thus enables more appropriate sharpening processing.

Also, the switch unit is not limited to the amplifier 31, but a switching circuit or the like may be appropriately used.

Further, since the adders (32, 33, and 34) add the image signal of the same frame input from each path, the adders are provided with a delay element for timing adjustment, as necessary.

Since the present embodiment may compensate the high frequency domain exceeding the Nyquist frequency, the present embodiment has a great advantage in terms of being capable of sufficiently sharpening the video to be displayed in real time with a simple configuration, such as when a display of a high definition television (HDTV) receiver displays an image by carrying out the enlargement processing on the image signal of a standard definition television (SDTV) and when the image signal of the HDTV is up-converted so as to be displayed in a 4K display.

Note that, in the image processing apparatus 1, the order of the sharpening processing in the horizontal direction and the sharpening processing in the vertical direction may be altered. That is, the input image signal $S_{in}$ may be processed by interchanging the position of the configuration of sharpening processing in the horizontal direction (the first two-dimensional LPF 11 and the horizontal sharpening processing unit FEh) and the position of the configuration of the sharpening processing in the vertical direction (the second two-dimensional LPF 12 and the vertical sharpening processing unit FEv).

Also, in place of the two-dimensional LPF, the vertical LPF and the horizontal LPF may be used. In this case, the vertical LPF is disposed at a preceding stage of the horizontal sharpening processing unit FEh, and the horizontal LPF is disposed at a preceding stage of the vertical sharpening processing unit FEv.

Further, another two-dimensional LPF may be disposed at a subsequent stage of the third adder 34 in order to further ensure the attenuation of the high frequency component. Preferably, this two-dimensional filter removes a region of the frequency component of the output image signal $S_{out}$ at high frequencies in both the horizontal direction and the vertical direction.

(Relation between Filter Configuration and Multiplier)

Here, a relation between a filter structure and the multipliers serving as a premise for the necessary calculation of the multipliers will be supplementarily described. According to the disclosure herein, in carrying out two-dimensional filter processing, the image processing before the up-conversion refers to image information of three pixels each before and after a pixel of processing subject in the horizontal direction and the vertical direction. That is, for a subject pixel $X_{ij}$, 7×7 pixel information of $X_{kl}$ (k=i−3, i−2, i−1, i, i+1, i+2, i+3, l=j−3, j−2, j−1, j, j+1, j+2, j+3) is processed. The image processing after the up-conversion, since many pixel information is necessary in order to obtain necessary (equivalent to the image before enlargement) characteristics, refers to the image information of 15 pixels each before and after the pixel of the processing subject in the horizontal direction and the vertical direction. That is, for the subject pixel $X_{ij}$, 15×15 pixel information of $X_{kl}$ (k=i−7 to i−1, I, i+1 to i+7, l=j−7 to j−1, j, j+1 to j+7) is processed.

In processing the 7×7 pixel information, when there is no correlation between each filter coefficient $A_{kl}$ of the two-dimensional filters, for calculation of a resulting value $\Sigma A_{kl} X_{kl}$ of the filter processing, 7×7=49 multipliers will be necessary. However, since a usual image filter characteristic is vertically symmetric and horizontally symmetric (e.g., see FIG. 23), a coefficient sequence is also vertically symmetric and horizontally symmetric. By utilizing such characteristic, the filter coefficient A may be represented by 16 elements of $A_{kl}$ (k=1 to 4, l=1 to 4), and thus the number of multipliers may be reduced to 16.

Figure 18:
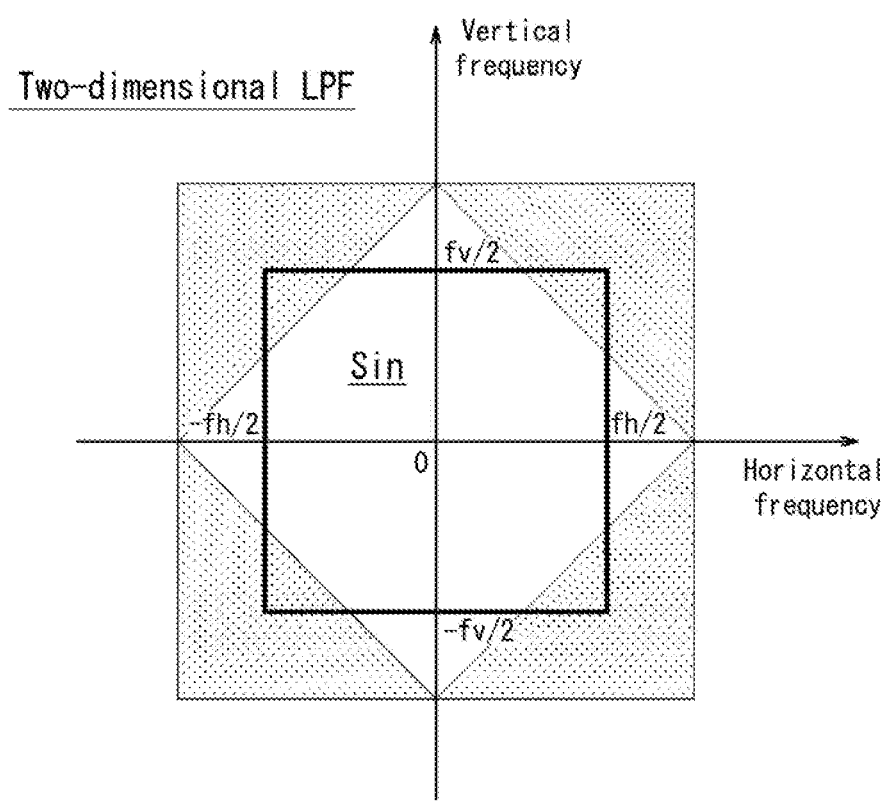
FIG. 18 is a diagram illustrating frequency characteristics of a conventional two-dimensional filter.
Figure 19:
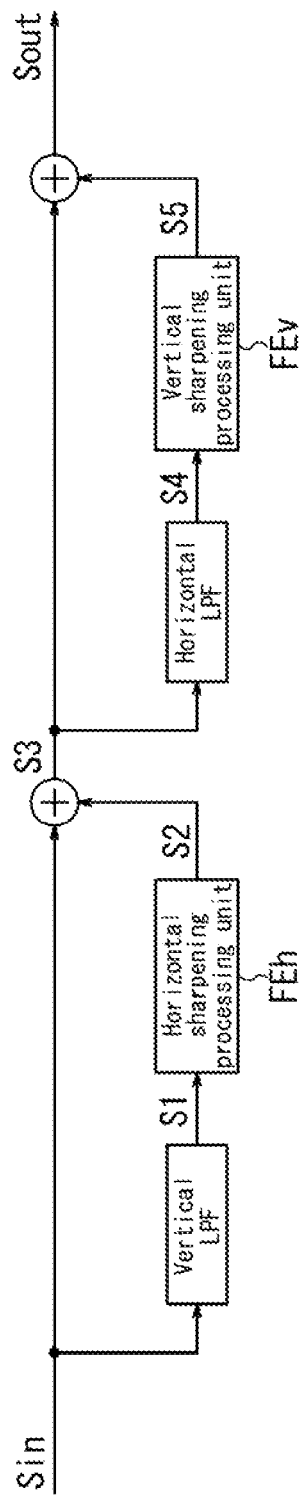
FIG. 19 is a diagram illustrating an image processing apparatus (a series type) suitable for image sharpening that has been suggested.

Further, when the two-dimensional filter is "a common two-dimensional filter" used commonly for the horizontal processing and the vertical processing, the same coefficients line in the vertical direction and the horizontal direction (e.g., see symmetry with a diagonal line serving as an axis in FIG. 18). Therefore, the filter coefficient A of the above 7×7 may be represented by 10 factors ($A_{11}$, $A_{12}$, $A_{13}$, $A_{14}$, $A_{22}$, $A_{23}$, $A_{24}$, $A_{33}$, $A_{34}$, and $A_{44}$), and the number of multipliers may be reduced to 10.

Similarly, the two-dimensional filter of 15×15 tap used after the up-conversion, by utilizing the symmetry, may be substantialized by 64 multipliers when the two-dimensional filter is a usual two-dimensional filter and, further, may be substantialized by 36 multipliers when the two-dimensional filter is the "common two-dimensional filter". Similarly, a one-dimensional filter is designed by utilizing the symmetry of the filter coefficients.

Note that the up-converter having vertical interpolation of four-tap and horizontal interpolation of four-tap vertically connected to each other is used, and the up-converter uses two multipliers each in the vertical direction and the horizontal direction (four multipliers in total).

The disclosure herein, based on the premise as described above, the circuit scale of each embodiment is evaluated based on the number of necessary multipliers.

EXAMPLE 2

Example 2 relates to a circuit in which the two-dimensional LPF in the horizontal direction and the two-dimensional LPF in the vertical direction, which are separately provided in Example 1, are commonly provided.

Figures 7A, 7B:
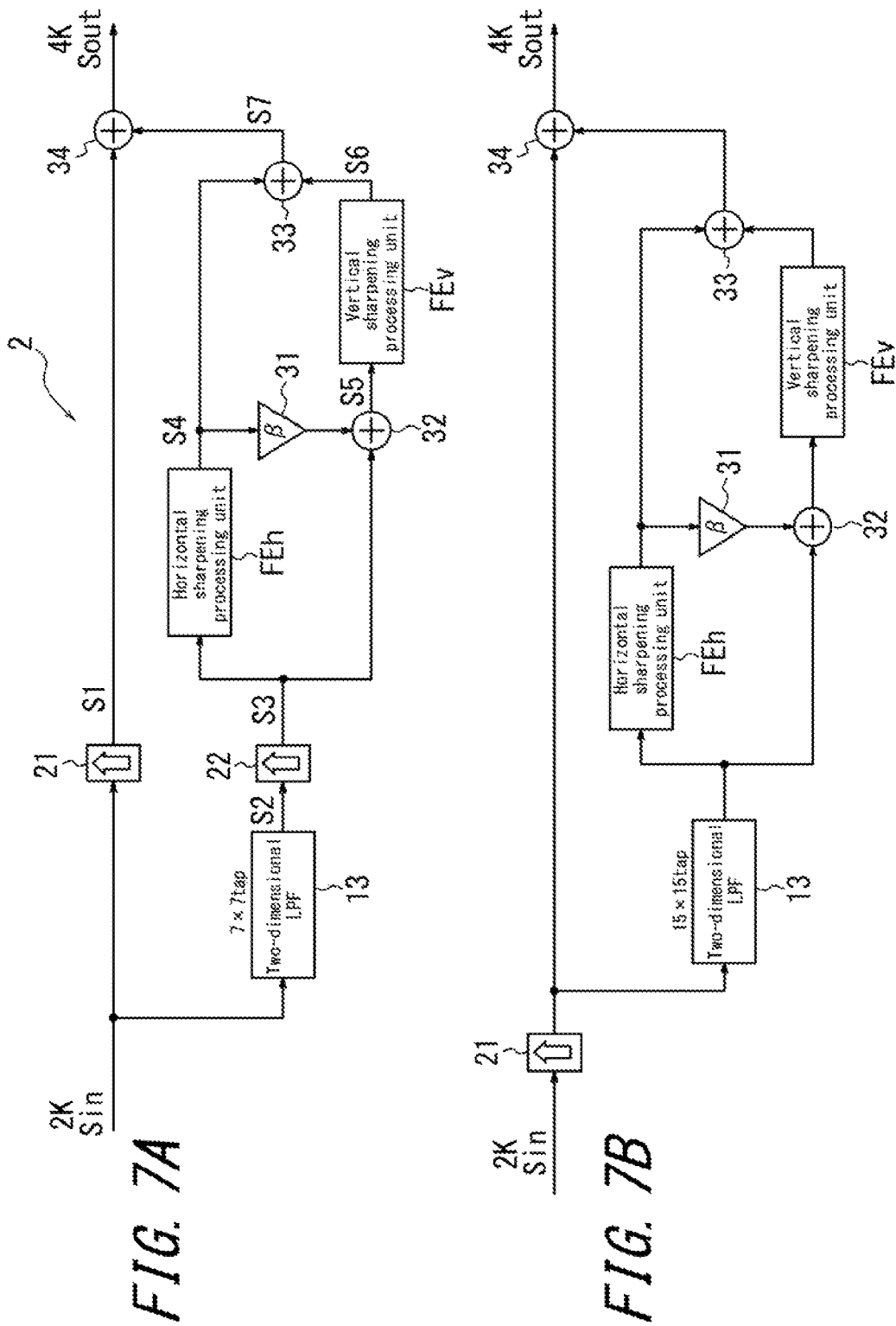
FIGS. 7A and 7B are diagrams illustrating a configuration of an image processing apparatus according to a second embodiment.

FIG. 7A is a diagram illustrating a configuration of an image processing apparatus 2 according to Example 2. The image processing apparatus 2 includes a two-dimensional LPF (a common filter) 13 for noise removal, two up-converters 21 and 22, the horizontal sharpening processing unit FEh, the vertical sharpening processing unit FEv, the amplifier (the switch unit) 31, the first adder 32, the second adder 33, and the third adder 34. In the image processing apparatus 2, the up-converter 21 is disposed between the input and the output of the path of the base image signal. Also, at a subsequent stage of the two-dimensional LPF 13, the up-converter 22 is disposed, followed by the horizontal sharpening processing unit FEh and the vertical sharpening processing unit FEv. The amplifier 31 serving as the switch unit is connected to the output end of the horizontal sharpening processing unit FEh and the input end of the vertical sharpening processing unit FEv. The amplifier 31, based on the setting thereof (the amplification factor $\beta$), changes between the parallel connection ($\beta=0$) and the series connection ($\beta=1$) of the horizontal direction processing unit and the vertical direction processing unit. Since the amplification factor $\beta$ of the amplifier 31 satisfies $0 \leq \beta \leq 1$, when the amplification factor $\beta$ satisfies $0 < \beta < 1$, the amplifier 31, rather than strictly changing to one of the parallel connection and the series connection, may have a circuit including both the parallel connection and the series connection.

Here, the two-dimensional LPF 13 is characteristic in being capable of generating an appropriate harmonic by the sharpening processing also to the signal component near the limits of the Nyquist frequency at the four corners of the two-dimensional frequency spectrum of the input image signal $S_{in}$ and, also, in order to prevent the generation of the unnecessary harmonic during the sharpening processing at the subsequent stage, removing at least the high frequency portion of the frequency components in the horizontal direction and the vertical direction contained in the input image signal $S_{in}$. That is, the two-dimensional filter LPF 13 is a noise-removal filter. Here, the high frequency portion is the region at high frequencies in both the horizontal direction and the vertical direction that causes the glitter and thus removed or attenuated in order to prevent the generation of the high frequency component during the sharpening processing, and may be appropriately set by those who are skilled in the art taking the sharpening characteristics of the sharpening processing units (FEv and FEh) at the subsequent stage of the two-dimensional LPF into consideration.

The input image signal $S_{in}$ corresponding to, for example, the 2K image is input to the up-converter 21 and up-converted into the first signal S1 corresponding to, for example, the 4K image and then output to the third adder 34.

The two-dimensional LPF 13 partially attenuates the high frequency domain of the vertical direction component and the horizontal direction component of the input image signal $S_{in}$ and outputs the second signal S2 to the up-converter 22.

The up-converter 22 up-converts the second signal S2 into the third signal S3 corresponding to the 4K image and outputs the third signal S3 to the horizontal sharpening processing unit FEh and the first adder 32.

The horizontal sharpening processing unit FEh generates the harmonic in the horizontal direction containing the frequency component higher than the frequency component in the horizontal direction included in the input signal. The horizontal sharpening processing unit FEh carries out the sharpening processing in the horizontal direction of the image represented by the third signal S3 received from the up-converter 22 and outputs the fourth signal S4 thus obtained to the amplifier (the switch unit) 31. The horizontal sharpening processing unit FEh generates the harmonic in the horizontal direction containing the frequency component exceeding the Nyquist frequency in the horizontal direction.

The first adder 32 generates the fifth signal S5 by combining the third signal S3 received from the up-converter 22 and a signal obtained by amplifying the fourth signal S4 received from the horizontal sharpening processing unit FEh with the amplification factor $\beta$ of the amplifier (the switch unit) 31.

The vertical sharpening processing unit FEv generates the harmonic in the vertical direction containing the frequency component higher than the frequency component in the vertical direction contained in the input signal. The vertical sharpening processing unit FEv carries out the sharpening processing in the vertical direction of the image represented by the fifth signal S5 received from the first adder 32 and outputs the sixth signal S6 thus obtained to the second adder 33. The vertical sharpening processing unit FEv generates the harmonic in the vertical direction containing the frequency component exceeding the Nyquist frequency in the vertical direction.

The second adder 33 generates the seventh signal S7 by combining the fourth signal S4 received from the horizontal sharpening processing unit FEh and the sixth signal S6 received from the vertical sharpening processing unit FEv.

The third adder 34 generates the output image signal $S_{out}$ by combining the first signal S1 received from the up-converter 21 and the seventh signal S7 received from the second adder 33.

The image processing apparatus 2 of Example 2, at the stage of filter processing before the sharpening processing, since one two-dimensional LPF (7×7 tap) for the input image signal $S_{in}$ needs 10 multipliers and four multipliers are used for each of the two up-converters, may thus substantialize the filter processing and the up-conversion with 18 (10+4×2) multipliers.

For a comparison purpose, the image processing apparatus 2 will be compared to an image processing apparatus of FIG. 7B that immediately (before the path of the sharpening processing) up-converts the input image signal $S_{in}$. FIG. 7B is a diagram illustrating a configuration of an image processing apparatus that has a circuit structure corresponding to that of Example 2 and up-converts first in a conventional manner. This image processing apparatus includes one up-converter 21, the two-dimensional LPF 13 for noise removal, the horizontal sharpening processing unit FEh, the vertical sharpening processing unit FEv, the amplifier (the switch unit) 31, the first adder 32, the second adder 33, and the third adder 34. Although the circuit structure of this image processing apparatus is basically the same as that of Example 2, the two-dimensional LPF of 15×15 tap is used to process an up-converted image.

In this image processing apparatus used for the comparison, the up-converter 21 immediately (before the path of the sharpening processing) up-converts the input image signal Sm and outputs the signal thus obtained to the two-dimensional LPF 13 and the third adder. The two-dimensional LPF 13 carries out filter processing for partially attenuating the high frequency domain of the vertical direction component and the horizontal direction component of the up-converted image signal. Then, the horizontal sharpening processing unit FEh and the vertical sharpening processing unit FEh carry out the sharpening processing in the horizontal direction and the vertical direction, respectively. Note that, at the output end of the horizontal sharpening processing unit FEh, the amplifier 31 serving as the switch unit is disposed and, by setting the amplifier 31 (the amplification factor β), the signal obtained by multiplying the output of the horizontal sharpening processing unit FEh β-times is added to the signal from the two-dimensional LPF, and the vertical sharpening processing unit FEv carries out the vertical sharpening processing.

In this case, each of the up-converters needs 4 multipliers, and the two-dimensional LPF (15×15 tap) needs 36 multipliers. Therefore, before the sharpening processing, 40 multipliers are required. Accordingly, Example 2 in FIG. 7A may significantly reduce the number of multipliers as compared to the image processing apparatus of FIG. 7B.

According to Example 2, also, since the two-dimensional LPF is disposed at the preceding stage of the horizontal sharpening processing unit FEh and the vertical sharpening processing unit FEv, the image may be sharpened without generating, in the frequency domain exceeding the frequency components in both the horizontal direction and the vertical direction of the input image, a frequency component caused by the sharpening processing in the horizontal direction and the vertical direction in the overlapping manner, and the glitter/flicker of the image may be reduced.

Note that, in the image processing apparatus 2, the order (position) of the sharpening processing in the horizontal direction and the sharpening processing in the vertical direction may be altered.

Also, another two-dimensional LPF may be further provided at the subsequent stage of the third adder 34 in order to further ensure the attenuation of the high frequency component. Preferably, this two-dimensional filter removes a region of the frequency component of the output image signal $S_{out}$ at high frequencies in both the horizontal direction and the vertical direction.

(Second Embodiment)

In an image processing apparatus according to a second embodiment, the up-converter is disposed between an HPF and the nonlinear arithmetic unit in the sharpening processing unit. That is, all of the filter operations by the two-dimensional LPF for noise removal, the horizontal HPF of the sharpening processing unit, and the vertical HPF of the sharpening processing unit are carried out before the up-converting processing. Note that, here, the sharpening processing unit has the first configuration set forth above.

EXAMPLE 3

Figure 20:
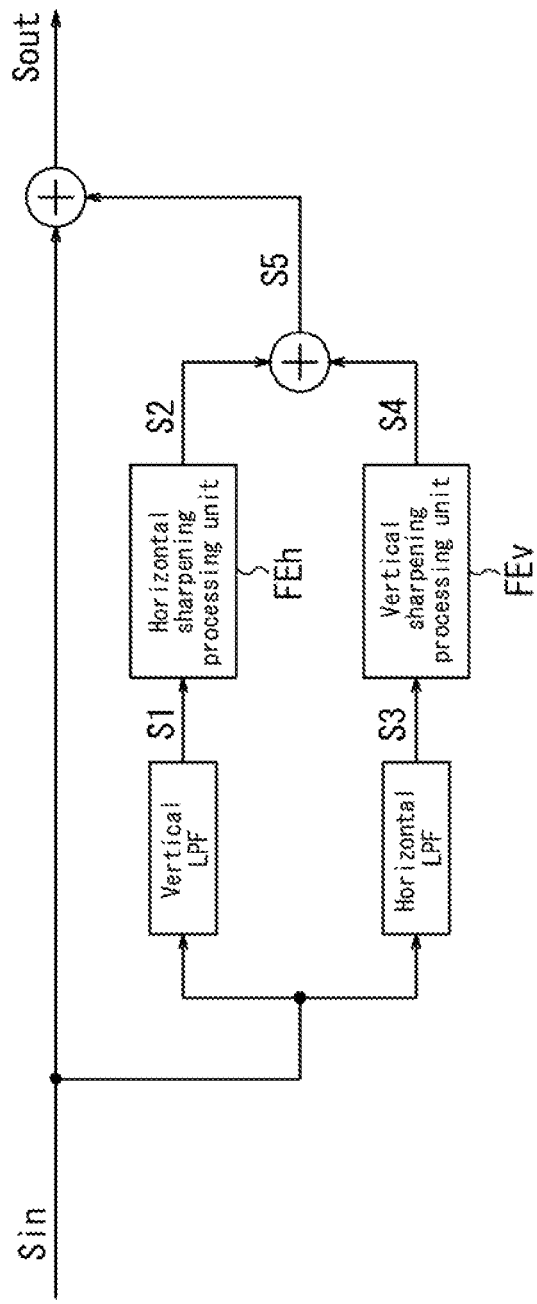
FIG. 20 is a diagram illustrating an image processing apparatus (a parallel type) suitable for the image sharpening that has been suggested.
Figure 21:
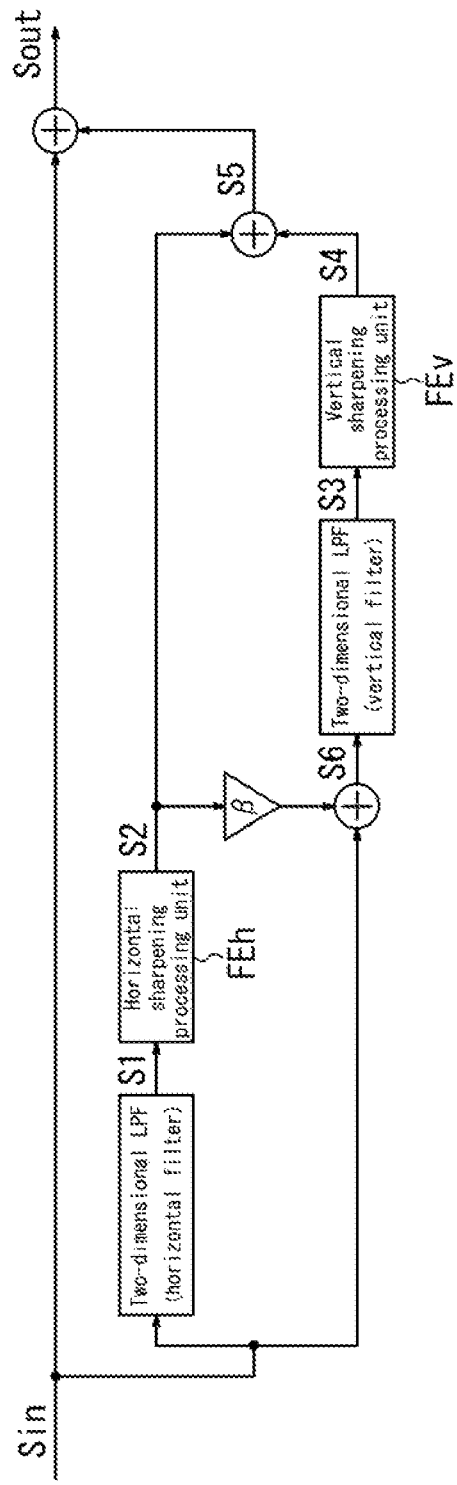
FIG. 21 is a diagram illustrating an image processing apparatus (a switch type) suitable for the image sharpening that has been suggested.
Figure 22:
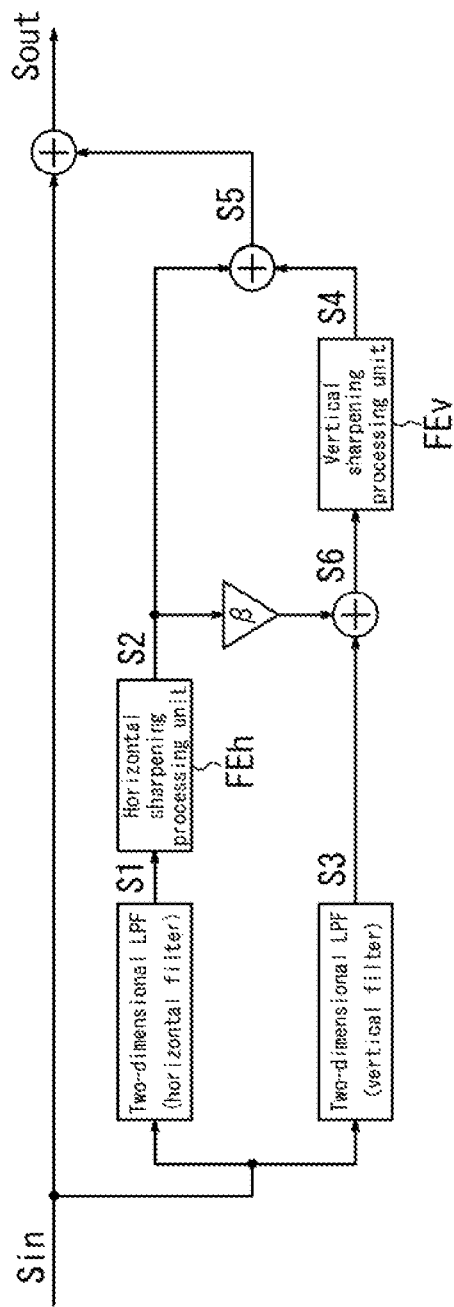
FIG. 22 is a diagram illustrating an exemplary variation of the image processing apparatus (the switch type) suitable for the image sharpening that has been suggested.

FIG. 8 are diagrams illustrating the up-conversion of the image processing apparatus for sharpening the input image having the horizontal direction processing unit in which the vertical filter is disposed at the preceding stage of the horizontal sharpening processing unit FEh and the vertical direction processing unit in which the horizontal filter disposed at the preceding stage of the vertical sharpening processing unit FEv, which are connected in parallel, as described in FIG. 20.

FIG. 8A is a diagram illustrating a configuration of an image processing apparatus 3 according to Example 3. The image processing apparatus 3 includes the first two-dimensional LPF (the horizontal filter) 11 and the second two-dimensional LPF (the vertical filter) 12 those for noise removal, the horizontal HPF 14, the nonlinear arithmetic unit 20, and the limiter 30 those constituting the horizontal sharpening processing unit FEh, the vertical HPF 15, the nonlinear arithmetic unit 20, and the limiter 30 those constituting the vertical sharpening processing unit FEv, three up-converters 21, 22, and 23, the first adder 32, and the second adder 33. The image processing apparatus 3 includes the horizontal direction processing unit in which the first two-dimensional LPF 11 is disposed at the preceding stage of the horizontal sharpening processing unit FEh and the vertical direction processing unit in which the second two-dimensional LPF 12 is disposed at the preceding stage of the vertical sharpening processing unit FEv, and the horizontal direction processing unit and the vertical direction processing unit are connected in parallel. In the image processing apparatus 3, the up-converter 21 is disposed between the input and the output of the path of the base image signal. Also, in the horizontal sharpening processing unit FEh, the up-converter 22 is disposed between the horizontal HPF 14 and the nonlinear arithmetic unit 20 and, in the vertical sharpening processing unit FEv, the up-converter 23 is disposed between the vertical HPF 15 and the nonlinear arithmetic unit 20.

The input image signal $S_{in}$ corresponding to, for example, the 2K image is input to the up-converter 21 and up-converted into the first signal S1 corresponding to, for example, the 4K image, and then output to the second adder 33.

The first two-dimensional LPF (the horizontal filter) 11 removes the high frequency portion of the frequency component in the vertical direction of the input image signal $S_{in}$ and partially attenuates the high frequency domain of the vertical direction component of the input image signal $S_{in}$, and outputs the second signal S2 thus obtained to the horizontal sharpening processing unit FEh. Note that the high frequency portion or the high frequency domain mentioned here is removed or attenuated in order to prevent the generation of the high frequency component by the sharpening processing in the region at high frequencies in both the horizontal direction and the vertical direction that causes the glitter, and may be appropriately set by those who are skilled in the art taking the sharpening characteristics of the horizontal sharpening processing unit FEh at the subsequent stage into consideration.

The horizontal sharpening processing unit FEh generates the harmonic in the horizontal direction containing the frequency component higher than the frequency component in the horizontal direction contained in the input image signal $S_{in}$ and carries out the sharpening processing in the horizontal direction of the image represented by the second signal S2 received from the first two-dimensional LPF 11. In the present example, the up-conversion is carried out within the horizontal sharpening processing unit FEh.

Within the horizontal sharpening processing unit FEh, the horizontal HPF 14 removes at least the DC component of the frequency component contained in the second signal S2 and thus generates the third signal S3, which is the high frequency signal. The up-converter 22 up-converts the third signal S3 into the fourth signal S4 corresponding to, for example, the 4K image and outputs the fourth signal S4 to the nonlinear arithmetic unit 20. The nonlinear arithmetic unit 20 carries out, on the fourth signal S4, the nonlinear arithmetic processing represented by the continuous nonlinear function that passes through the origin and is asymmetric in the positive region and the negative region, and thus generates the fifth signal S5. By this nonlinear arithmetic processing, the harmonic in the horizontal direction containing the frequency component exceeding the Nyquist frequency in the horizontal direction is generated. The limiter 30 functions as the adjuster of amplitude (a signal level) of the fifth signal S5 and generates the sixth signal S6 by adjusting the fifth signal S5, and then outputs the sixth signal S6 to the first adder 32.

The second two-dimensional LPF (vertical filter) 12 removes the high frequency portion of the frequency component in the horizontal direction of the input image signal $S_{in}$, partially attenuates the high frequency domain of the horizontal direction component of the input image signal $S_{in}$, and outputs the seventh signal S7 thus obtained to the vertical sharpening processing unit FEv. Note that the high frequency portion or the high frequency domain mentioned here is removed or attenuated in order to prevent the generation of the high frequency component by the sharpening processing in the region at high frequencies in both the horizontal direction and the vertical direction that causes the glitter, and may be appropriately set by those who are skilled in the art taking the sharpening characteristics of the vertical sharpening processing unit FEv at the subsequent stage into consideration.

The vertical sharpening processing unit FEv generates the harmonic in the vertical direction containing the frequency component higher than the frequency component in the vertical direction contained in the input image signal $S_{in}$ and carries out the sharpening processing in the vertical direction of the image represented by the seventh signal S7 received from the second two-dimensional LPF 12. In the present example, the up-conversion is carried out within the vertical sharpening processing unit FEv.

Within the vertical sharpening processing unit FEv, the vertical HPF 15 removes at least the DC component of the frequency component contained in the seventh signal S7 and thus generates the eighth signal S8, which is the high frequency signal. The up-converter 23 up-converts the eighth signal S8 into the ninth signal S9 corresponding to, for example, the 4K image and outputs the ninth signal S9 to the nonlinear arithmetic unit 20. The nonlinear arithmetic unit 20 carries out, on the ninth signal S9, the nonlinear arithmetic processing represented by the continuous nonlinear function that passes through the origin and is asymmetric in the positive region and the negative region, and thus generates a tenth signal S10. By this nonlinear arithmetic processing, the harmonic in the vertical direction containing the frequency component exceeding the Nyquist frequency in the vertical direction is generated. The limiter 30 functions as the adjuster of the amplitude (the signal level) of the tenth signal S10 and generates a eleventh signal S11 by adjusting the tenth signal S10, and then outputs the eleventh signal S11 to the first adder 32.

The first adder 32 generates a twelfth signal S12 by combining the sixth signal S6 received from the horizontal sharpening processing unit FEh and the eleventh signal S11 received from the vertical sharpening processing unit FEv.

The second adder 33 generates the output image signal $S_{out}$ by combining the first signal S1 received from the up-converter 21 and the twelfth signal S12 received from the first adder 32.

In the image processing apparatus 3 of Example 3, at the preceding stage of the nonlinear arithmetic unit, since 16 multipliers are used for each of the two two-dimensional LPFs (7×7 tap) for the input image signal $S_{in}$, the four multipliers are used for each of the horizontal HPF (7 tap) and the vertical HPF (7 tap), and four multipliers are used for each of the three up-converters, the filter processing and the up-conversion at the preceding stage of the nonlinear arithmetic processing may be substantialized by 52 (16×2+4×5) multipliers in total.

For a comparison purpose, the image processing apparatus 3 will be compared to an image processing apparatus of FIG. 8B that immediately (before the path of the sharpening processing) up-converts the input image signal $S_{in}$. FIG. 8B is a diagram illustrating a configuration of an image processing apparatus that has a circuit structure corresponding to that of Example 3 and up-converts first in the conventional manner. This image processing apparatus includes one up-converter 21, the first two-dimensional LPF (the horizontal filter) 11 and the second two-dimensional LPF (the vertical filter) 12 those for noise removal, the horizontal HPF 14, the nonlinear arithmetic unit 20, and the limiter 30 those constituting the horizontal sharpening processing unit FEh, the vertical HPF 15, the nonlinear arithmetic unit 20, and the limiter 30 those constituting the vertical sharpening processing unit FEv, the first adder 32, and the second adder 33. Although the circuit structure of this image processing apparatus is basically the same as that of Example 3, the two-dimensional LPF of 15×15 tap is used to process the up-converted image, and the horizontal HPF of 15 tap and the vertical HPF of 15 tap are used.

In this image processing apparatus used for the comparison, the up-converter 21 immediately (before the path of the sharpening processing) up-converts the input image signal $S_{in}$, and outputs the signal thus obtained to the two-dimensional LPFs 11 and 12. The first two-dimensional LPF 11 carries out the filter processing for partially attenuating the high frequency domain of the vertical direction component of the up-converted image signal, and the second two-dimensional LPF 12 carries out the filter processing for partially attenuating the high frequency domain of the horizontal direction component of the up-converted image signal. Then, the horizontal sharpening processing unit FEh (the horizontal HPF 14, the nonlinear arithmetic unit 20, and the limiter 30) and the vertical sharpening processing unit FEh (the vertical HPF 15, the nonlinear arithmetic unit 20, and the limiter 30) carry out the sharpening processing in the horizontal direction and the vertical direction, respectively. Then, the first adder 32 and the second adder 33 combine the signal subjected to the sharpening processing and the signal obtained by up-converting the input image signal $S_{in}$.

In this case, each of the up-converters needs 4 multipliers, and the two-dimensional LPF (15×15 tap) needs 64 multipliers. Also, each horizontal HPF (15 tap) and vertical HPF (15 tap) needs 8 multipliers. Therefore, at the preceding stage of the nonlinear arithmetic unit, 148 (4+64×2+8×2)

multipliers are necessary. Accordingly, Example 3 in FIG. 8A may significantly reduce the number of multipliers as compared to the image processing apparatus of FIG. 8B.

According to the present example, since the two-dimensional LPFs are disposed at the preceding stages of the horizontal sharpening processing unit FEh and the vertical sharpening processing unit FEv, the image may be sharpened without generating, in the frequency domain exceeding the frequency components in both the horizontal direction and the vertical direction of the input image, the frequency component caused by the sharpening processing in the horizontal direction and the vertical direction in the overlapping manner, and the glitter/flicker of the image may be reduced. Also, since the method of the disclosure herein allows selection of the filters particularly for the band necessary for generation of each horizontal harmonic and vertical harmonic, excellent harmonics in the horizontal direction and the vertical direction may be obtained without generating a noise and an image may be sharpened into a clear image.

Note that, in place of the two-dimensional LPF, the vertical LPF and the horizontal LPF may be used. In this case, the vertical LPF is used at the preceding stage of the horizontal sharpening processing unit FEh, and the horizontal LPF is used at the preceding stage of the vertical sharpening processing unit FEv.

Also, another two-dimensional LPF may be further provided at a subsequent stage of the second adder 33 in order to further ensure the attenuation of the high frequency component. Preferably, this two-dimensional filter removes a region of the frequency component of the output image signal $S_{out}$ at high frequencies in both the horizontal direction and the vertical direction.

EXAMPLE 4

Example 4 relates to a circuit in which the two-dimensional LPF in the horizontal direction and the two-dimensional LPF in the vertical direction, which are separately provided in Example 3, are commonly provided.

FIG. 9A is a diagram illustrating a configuration of an image processing apparatus 4 according to Example 4. The image processing apparatus 4 includes the two-dimensional LPF 13 for noise removal, the horizontal HPF 14, the nonlinear arithmetic unit 20, and the limiter 30 those constituting the horizontal sharpening processing unit FEh, the vertical HPF 15, the nonlinear arithmetic unit 20, and the limiter 30 those constituting the vertical sharpening processing unit FEv, three up-converters 21, 22, and 23, the first adder 32, and the second adder 33. In the image processing apparatus 4, the two-dimensional LPF 13 for common use is disposed at the preceding stage of the horizontal sharpening processing unit FEh and the vertical sharpening processing unit FEv. In the image processing apparatus 4, also, the up-converter 21 is disposed between the input and the output of the path of the base image signal. Further, the up-converter 22 is disposed between the horizontal HPF 14 and the nonlinear arithmetic unit 20 in the horizontal sharpening processing unit FEh, and the up-converter 23 is disposed between the vertical HPF 15 and the nonlinear arithmetic unit 20 in the vertical sharpening operation unit FEv.

The input image signal $S_{in}$ corresponding to, for example, the 2K image is input to the up-converter 21, up-converted into the first signal S1 corresponding to, for example, the 4K image, and then output to the second adder 33.

The two-dimensional LPF 13 is characteristic in being capable of generating an appropriate harmonic by the sharpening processing also to the signal component near the limits of the Nyquist frequency at the four corners of the two-dimensional frequency spectrum of the input image signal $S_{in}$ and, also, in order to prevent the generation of the unnecessary harmonic during the sharpening processing at the subsequent stage, removing t at least he high frequency portion of the frequency components in the horizontal direction and the vertical direction contained in the input image signal $S_{in}$. That is, the two-dimensional filter LPF 13 is the noise-removal filter. Here, the high frequency portion is the region at high frequencies in both the horizontal direction and the vertical direction that causes the glitter and thus removed or attenuated in order to prevent the generation of the high frequency component during the sharpening processing, and may be appropriately set by those who are skilled in the art taking the sharpening characteristics of the sharpening processing units (FEv and FEh) at the subsequent stage of the two-dimensional LPF into consideration.

The horizontal sharpening processing unit FEh generates the harmonic in the horizontal direction containing the frequency component higher than the frequency component in the horizontal direction contained in the input signal and carries out the sharpening processing in the horizontal direction of the image represented by the second signal S2 received from the two-dimensional LPF 13. In the present example, the up-conversion is carried out within the horizontal sharpening processing unit FEh.

Within the horizontal sharpening processing unit FEh, the horizontal HPF 14 removes at least the DC component of the frequency component contained in the second signal S2 and thus generates the third signal S3, which is the high frequency signal. The up-converter 22 up-converts the third signal S3 into the fourth signal S4 corresponding to, for example, the 4K image and outputs the fourth signal S4 to the nonlinear arithmetic unit 20. The nonlinear arithmetic unit 20 carries out, on the fourth signal S4, the nonlinear arithmetic processing represented by the continuous nonlinear function that passes through the origin and is asymmetric in the positive region and the negative region, and thus generates the fifth signal S5. By this nonlinear arithmetic processing, the harmonic in the horizontal direction containing the frequency component exceeding the Nyquist frequency in the horizontal direction is generated. The limiter 30 functions as the adjuster of amplitude (the signal level) of the fifth signal S5 and generates the sixth signal S6 by adjusting the fifth signal S5, and then outputs the sixth signal S6 to the first adder 32.

The vertical sharpening processing unit FEv generates the harmonic in the vertical direction containing the frequency component higher than the frequency component in the vertical direction contained in the input signal and carries out the sharpening processing in the vertical direction of the image represented by the second signal S2 received from the two-dimensional LPF 13. In the present example, the up-conversion is carried out within the vertical sharpening processing unit FEv.

Within the vertical sharpening processing unit FEv, the vertical HPF 15 removes at least the DC component of the frequency component contained in the second signal S2 and thus generates the seventh signal S7, which is the high frequency signal. The up-converter 23 up-converts the seventh signal S7 into the eighth signal S8 corresponding to, for example, the 4K image and outputs the eighth signal S8 to the nonlinear arithmetic unit 20. The nonlinear arithmetic unit 20 carries out, on the eighth signal S8, the nonlinear arithmetic processing represented by the continuous nonlinear function that passes through the origin and is asymmetric in the positive region and the negative region, and thus generates the ninth signal S9. By this nonlinear arithmetic processing, the harmonic in the vertical direction containing the frequency component exceeding the Nyquist frequency in the vertical direction is generated. The limiter 30 functions as the adjuster of amplitude (the signal level) of the ninth signal S9 and generates the tenth signal S10 by adjusting the ninth signal 9, and then outputs the tenth signal S10 to the first adder 32.

The first adder 32 generates the eleventh signal S11 by combining the sixth signal S6 received from the horizontal sharpening processing unit FEh and the tenth signal S10 received from the vertical sharpening processing unit FEv.

The second adder 33 generates the output image signal $S_{out}$ by combining the first signal S1 received from the up-converter 21 and the eleventh signal S11 received from the first adder 32.

In the image processing apparatus 4 of Example 4, at the preceding stage of the nonlinear arithmetic unit, since 10 multipliers are used for the two-dimensional LPF (7×7 tap) for the input image signal $S_{in}$, 4 multipliers are used for each horizontal HPF (7 tap) and vertical HPF (7 tap), and 4 multipliers are used for each of the three up-converters, the filter processing and the up-conversion at the preceding stage of the nonlinear arithmetic processing may be substantialized by 30 (10×2+4×5) multipliers in total.

For a comparison purpose, the image processing apparatus 4 will be compared to an image processing apparatus of FIG. 9B that immediately (before the path of the sharpening processing) up-converts the input image signal $S_{in}$. FIG. 9B is a diagram illustrating a configuration of an image processing apparatus that has a circuit structure corresponding to that of Example 4 and carries out the up-conversion first in the conventional manner. This image processing apparatus includes one up-converter 21, the two-dimensional LPF 13 for noise removal, the horizontal HPF 14, the nonlinear arithmetic unit 20, and the limiter 30 those constituting the horizontal sharpening processing unit FEh, the vertical HPF 15, the nonlinear arithmetic unit 20, and the limiter 30 those constituting the vertical sharpening processing unit FEv, the first adder 32, and the second adder 33. Although the circuit structure of this image processing apparatus is basically the same as that of Example 4, the two-dimensional LPF of 15×15 tap is used to process the up-converted image, and the horizontal HPF of 15 tap and the vertical HPF of 15 tap are used.

In this image processing apparatus used for the comparison, the up-converter 21 immediately (before the path of the sharpening processing) up-converts the input image signal $S_{in}$ and outputs the signal thus obtained to the two-dimensional LPF 13. The two-dimensional LPF 13 carries out the filter processing for partially attenuating the high frequency domain of the vertical direction component and the horizontal direction component of the up-converted image signal. Then, the horizontal sharpening processing unit FEh (the horizontal HPF 14, the nonlinear arithmetic unit 20, and the limiter 30) and the vertical sharpening processing unit FEh (the vertical HPF 15, the nonlinear arithmetic unit 20, and the limiter 30) carry out the sharpening processing and in the horizontal direction and the vertical direction, respectively. Then, the first adder 32 and the second adder 33 combine the signal subjected to the sharpening processing and the signal obtained by up-converting the input image signal $S_{in}$.

In this case, each of the up-converters needs 4 multipliers, and the two-dimensional LPF (15×15 tap) needs 36 multipliers. Also, each horizontal HPF (15 tap) and vertical HPF (15 tap) needs 8 multipliers. Therefore, at the preceding stage of the nonlinear arithmetic unit, 56 (4+36+8×2) multipliers are necessary. Accordingly, Example 4 in FIG. 9A may significantly reduce the number of multipliers as compared to the image processing apparatus of FIG. 9B.

According to the present example, since the two-dimensional LPF is disposed at the preceding stage of the horizontal sharpening processing unit FEh and the vertical sharpening processing unit FEv, the image may be sharpened without generating, in the frequency domain exceeding the frequency components in both the horizontal direction and the vertical direction of the input image, the frequency component caused by the sharpening processing in the horizontal direction and the vertical direction in the overlapping manner, and the glitter/flicker of the image may be reduced.

Also, another two-dimensional LPF may be further provided at the subsequent stage of the second adder 33 in order to further ensure the attenuation of the high frequency component. Preferably, this two-dimensional filter removes a region of the frequency component of the output image signal $S_{out}$ at high frequencies in both the horizontal direction and the vertical direction.

EXAMPLE 5

Example 5 relates to a circuit in which the horizontal sharpening processing unit FEh and the vertical sharpening processing unit FEv, which are separately provided in Example 4, are commonly provided by using the two-dimensional LPF.

Figure 10:
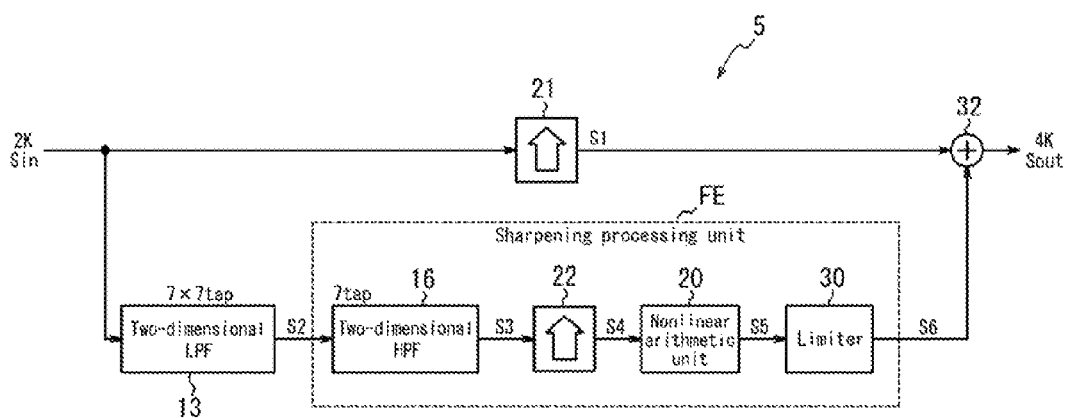
FIG. 10 is a diagram illustrating a configuration of an image processing apparatus according to a fifth embodiment.

FIG. 10 is a diagram illustrating a configuration of an image processing apparatus 5 according to Example 5. The image processing apparatus 5 includes the two-dimensional LPF 13 for noise removal, the two-dimensional HPF 16, the nonlinear arithmetic unit 20, and the limiter 30 those constituting the sharpening processing unit FE, two up-converters 21 and 22, and the first adder 32. In the image processing apparatus 5, the functions of the horizontal sharpening processing unit FEh and the vertical sharpening processing unit FEv are substantialized by one sharpening processing unit FE, and the two-dimensional LPF 13 is disposed at a preceding stage of the sharpening processing unit FE. In the image processing apparatus 5, the up-converter 21 is disposed between the input and the output of the path of the base image signal. Also, within the sharpening processing unit FE, the up-converter 22 is disposed between the two-dimensional HPF 16 and the nonlinear arithmetic unit 20.

The input image signal $S_{in}$ corresponding to, for example, the 2K image is input to the up-converter 21, up-converted into the first signal S1 corresponding to, for example, the 4K image, and then output to the first adder 32.

The two-dimensional LPF 13, corresponding to the two-dimensional LPF 13 of Example 4, is characteristic in being capable of generating an appropriate harmonic by the sharpening processing also to the signal component near the limits of the Nyquist frequency at the four corners of the two-dimensional frequency spectrum of the input image signal $S_{in}$ and, also, in order to prevent the generation of the unnecessary harmonic during the sharpening processing at the subsequent stage, removing at least the high frequency portion of the frequency component in the horizontal direction and the vertical direction contained in the input image signal $S_{in}$. That is, the two-dimensional filter LPF 13 is the noise-removal filter. Here, the high frequency portion is the region at high frequencies in both the horizontal direction and the vertical direction that causes the glitter and thus removed or attenuated in order to prevent the generation of the high frequency component in sharpening processing, and may be appropriately set by those who are skilled in the art taking the sharpening characteristics of the sharpening processing unit (FE) at the subsequent stage of the two-dimensional LPF into consideration. The two-dimensional LPF 13 partially attenuates the high frequency domain of the vertical direction component and the horizontal direction component of the input image signal $S_{in}$ and outputs the second signal S2 thus obtained to the sharpening processing unit FE.

The sharpening processing unit FE simultaneously generates the harmonic in the horizontal direction containing the frequency component higher than the frequency component in the horizontal direction contained in the input signal and the harmonic in the vertical direction containing the frequency component higher than the frequency component in the vertical direction contained in the input signal, by carrying out the nonlinear arithmetic processing one time, and carries out two-dimensional sharpening processing on the image represented by the second signal S2 received from the two-dimensional LPF 13. In the present example, the up-conversion is carried out within the sharpening processing unit FE.

Within the sharpening processing unit FE, the two-dimensional HPF 16 removes at least the DC component (the low frequency portion) of the frequency components in the horizontal direction and the vertical direction contained in the second signal S2 and thus generates the third signal S3, which is the high frequency signal. The up-converter 22 up-converts the third signal S3 into the fourth signal S4 corresponding to, for example, the 4K image and outputs the fourth signal S4 to the nonlinear arithmetic unit 20. The nonlinear arithmetic unit 20 carries out, on the fourth signal S4, the nonlinear arithmetic processing represented by the continuous nonlinear function that passes through the origin and is asymmetric in the positive region and the negative region, and thus generates the fifth signal S5. By this nonlinear arithmetic processing, the harmonic containing the frequency component exceeding the Nyquist frequency in the horizontal direction and the vertical direction is generated. The limiter 30 functions as the adjuster of amplitude (the signal level) of the fifth signal S5 and generates the sixth signal S6 by adjusting the fifth signal S5, and then outputs the sixth signal S6 to the first adder 32.

The first adder 32 generates the output image signal $S_{out}$ by combining the sixth signal S6 received from the sharpening processing unit FE and the first signal S1 received from the up-converter 21.

Figure 11A:
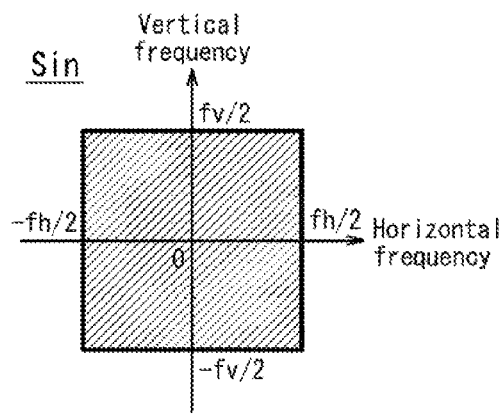
FIGS. 11A to 11C are diagrams illustrating frequency characteristics of the sharpening processing according to the fifth embodiment.
Figure 11B:
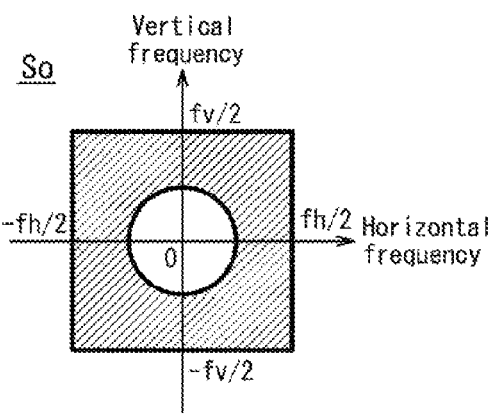
Figure 11C:
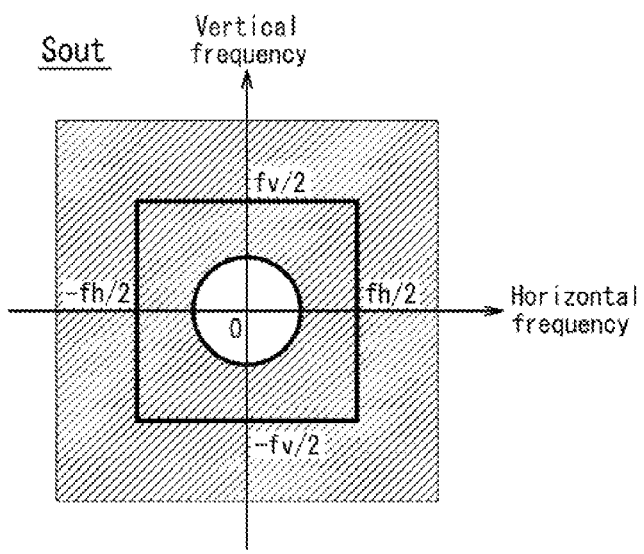

FIGS. 11 illustrates the frequency components of the signal at each stage when the sharpening processing is carried out by using the two-dimensional HPF. FIG. 11A illustrates the frequency component of the input image signal Si of the digital image having a horizontal sampling frequency fh and a vertical sampling frequency fv. In the figures, hatched areas represent regions containing the frequency components. The Nyquist frequency of the digital image is fh/2 in the horizontal direction and fv/2 in the vertical direction and, as can be seen in the figure, there is no frequency components in a region exceeding the Nyquist frequency. FIG. 11B illustrates a signal S0 obtained by carrying out the processing of two-dimensional HPF on the input image signal $S_{in}$. The two-dimensional HPF 16 used in the sharpening processing unit FE shows filter characteristics having a cut-off region in a low frequency domain (near 0 Hz) of the horizontal frequency and the vertical frequency containing at least the DC component. Therefore, from the image signal S0 subjected to the processing of the two-dimensional HPF, the low frequency components near 0 Hz are removed. When the nonlinear arithmetic unit 20 carries out the sharpening processing by using the nonlinear function on the image signal S0, as illustrated in FIG. 11C, in the output image signal $S_{out}$ obtained by the sharpening processing, the frequency components are generated in a wide range exceeding the Nyquist frequency fv/2 in the vertical direction and the Nyquist frequency fh/2 in the horizontal direction. As illustrated in the figure, since the nonlinear arithmetic processing carried out one time generates four corners of the frequency components of the output image signal $S_{out}$, i.e., the region at high frequencies in the horizontal direction and the vertical direction, efficiency of the arithmetic processing is improved. Further, a phenomenon in which the glittering of the image is emphasized due to the sharpening processing in the horizontal direction and the vertical direction in the overlapping manner as conventionally carried out does not occur.

In the image processing apparatus 5 of Example 5, at the preceding stage of the nonlinear arithmetic unit, since 10 multipliers are used for the two-dimensional LPF (7×7 tap) for the input image signal $S_{in}$, 10 multipliers are used for the two-dimensional HPF (7×7 tap), and 4 multipliers are used for each of the two up-converters, the filter processing and the up-conversion at the preceding stage of the nonlinear arithmetic processing may be substantialized by 28 (10×2+ 4×2) multipliers in total. Therefore, the number of multipliers may be significantly reduced as compared to the conventional image processing apparatus (using 56 multipliers) illustrated in FIG. 9B. Further, the present example may have only one line of the nonlinear arithmetic unit, unlike the image processing apparatus in FIG. 9 that needs two lines of the nonlinear arithmetic unit. Generally, in a method of performing interpolation from four representative points on the non-linear function, 27 multipliers are necessary for the nonlinear arithmetic unit of one line. Therefore, since one line may be omitted, the number of multipliers may be significantly reduced as compared to the conventional image processing apparatus illustrated in FIG. 9B.

According to the present example, also, since the two-dimensional LPF is disposed at the preceding stage of the sharpening processing unit FE, the image may be sharpened without generating, in the frequency domain exceeding the frequency components in both the horizontal direction and the vertical direction of the input image, the frequency component caused by the sharpening processing in the horizontal direction and the vertical direction in the overlapping manner, and the glitter/flicker of the image may be reduced.

According to the present example, also, instead of providing two lines of the sharpening processing in the horizontal direction and the vertical direction, one line of the sharpening processing unit FE for carrying out the two-dimensional processing may be provided. Therefore, the number of times of operation of the nonlinear arithmetic processing may be reduced and, as a result, the number of circuits as well as power consumption may be reduced.

Further, another two-dimensional LPF may be further provided at a subsequent stage of the first adder 32 in order to further ensure the attenuation of the high frequency component. Preferably, this two-dimensional filter removes a region of the frequency component of the output image signal $S_{out}$ at high frequencies in both the horizontal direction and the vertical direction.

EXAMPLE 6

In the above examples, the image processing apparatus includes the two-dimensional LPF at the preceding stage of the sharpening processing unit FE. However, the feature of the disclosure herein for carrying out the filter processing before the up-conversion is also applicable to an image processing apparatus having no two-dimensional LPF for noise removal.

Example 6 relates to a circuit of the image processing apparatuses according to Example 3 and Example 4 in which the two-dimensional LPF for noise removal is omitted.

Figures 12A, 12B:
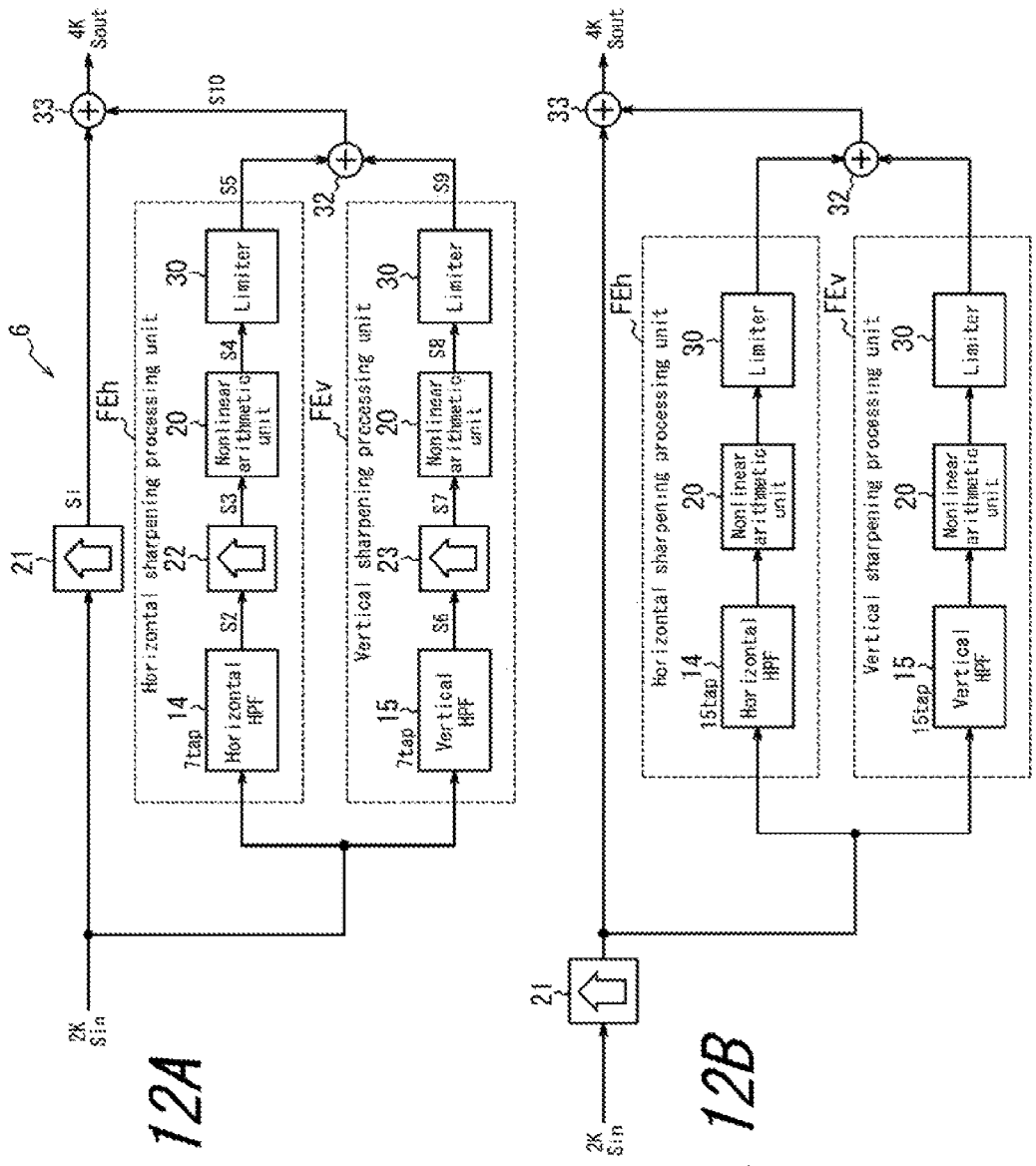
FIGS. 12A and 12B are diagrams illustrating a configuration of an image processing apparatus according to a sixth embodiment.

FIG. 12A is a diagram illustrating a configuration of an image processing apparatus 6 according to Example 6. The image processing apparatus 6 includes the vertical HPF 14, the nonlinear arithmetic unit 20, and the limiter 30 those constituting the horizontal sharpening processing unit FEh, the vertical HPF 15, the nonlinear arithmetic unit 20, and the limiter 30 those constituting the vertical sharpening processing unit FEv, three up-converters 21, 22, and 23, the first adder 32, and the second adder 33. In the image processing apparatus 6, the up-converter 21 is disposed between the input and output of the path of the base image signal. Also, the up-converter 22 is disposed between the horizontal HPF 14 and the nonlinear arithmetic unit 20 in the horizontal sharpening processing unit FEh, and the up-converter 23 is disposed between the vertical HPF 15 and the nonlinear arithmetic unit 20 in the vertical sharpening processing unit FEv.

The input image signal $S_{in}$ corresponding to, for example, the 2K image is input to the up-converter 21, up-converted into the first signal S1 corresponding to, for example, the 4K image, and then output to the second adder 33.

The horizontal sharpening processing unit FEh generates the harmonic in the horizontal direction containing the frequency component higher than the frequency component in the horizontal direction contained in the input signal and carries out the sharpening processing in the horizontal direction of the input image signal $S_{in}$. In the present example, up-conversion is carried out within the horizontal sharpening processing unit FEh.

Within the horizontal sharpening processing unit FEh, the horizontal HPF 14 removes at least the DC component of the frequency component contained in the input image signal $S_{in}$ and thus generates the second signal S2, which is the high frequency signal. The up-converter 22 up-converts the second signal S2 into the third signal S3 corresponding to, for example, the 4K image and outputs the third signal S3 to the nonlinear arithmetic unit 20. The nonlinear arithmetic unit 20 carries out, on the third signal S3, the nonlinear arithmetic processing represented by the continuous nonlinear function that passes through the origin and is asymmetric in the positive region and the negative region, and thus generates the fourth signal S4. By this nonlinear arithmetic processing, the harmonic in the horizontal direction containing the frequency component exceeding the Nyquist frequency in the horizontal direction is generated. The limiter 30 functions as the adjuster of the amplitude (the signal level) of the fourth signal S4 and generates the fifth signal S5 by adjusting the fourth signal S4, and then outputs the fifth signal S5 to the first adder 32.

The vertical sharpening processing unit FEv generates the harmonic in the vertical direction containing the frequency component higher than the frequency component in the vertical direction contained in the input signal and carries out the sharpening processing in the vertical direction of the input image signal $S_{in}$. In the present example, the up-conversion is carried out within the vertical sharpening processing unit FEv.

Within the vertical sharpening processing unit FEv, the vertical HPF 15 removes at least the DC component of the frequency component contained in the input image signal $S_{in}$ and thus generates the sixth signal S6, which is the high frequency signal. The up-converter 23 up-converts the sixth signal S6 into the seventh signal S7 corresponding to, for example, the 4K image and outputs the seventh signal S7 to the nonlinear arithmetic unit 20. The nonlinear arithmetic unit 20 carries out, on the seventh signal S7, the nonlinear arithmetic processing represented by the continuous nonlinear function that passes through the origin and is asymmetric in the positive region and the negative region, and thus generates the eighth signal S8. By this nonlinear arithmetic, the harmonic in the vertical direction containing the frequency component exceeding the Nyquist frequency in the vertical direction is generated. The limiter 30 functions as the adjuster of the amplitude (the signal level) of the eighth signal S8 and generates the ninth signal S9 by adjusting the eighth signal S8, and then outputs the ninth signal S9 to the first adder 32.

The first adder 32 generates the tenth signal S10 by combining the fifth signal S5 received from the horizontal sharpening processing unit FEh and the ninth signal S9 received from the vertical sharpening processing unit FEv.

The second adder 33 generates the output image signal $S_{out}$ by combining the first signal S1 received from the up-converter 21 and the tenth signal S10 received from the first adder 32.

In the image processing apparatus 6 of Example 6, at the preceding stage of the nonlinear arithmetic unit, since 4 multipliers are used for each of horizontal HPF (7 tap) and vertical HPF (7 tap) and 4 multipliers are used for the three up-converters, the filter processing and the up-conversion at the preceding stage of the nonlinear arithmetic processing may be substantialized by 20 (4×5) multipliers in total.

For a comparison purpose, the image processing apparatus 6 will be compared to an image processing apparatus of FIG. 12B that immediately (before the path of the sharpening processing) up-converts the input image signal $S_{in}$. FIG. 12B is a diagram illustrating a configuration of an image processing apparatus that has a circuit structure corresponding to that of Example 6 and carries out the up-conversion first in the conventional manner. This image processing apparatus includes one up-converter 21, the horizontal HPF 14, the nonlinear arithmetic unit 20, and the limiter 30 those constituting the horizontal sharpening processing unit FEh, the vertical HPF 15, the nonlinear arithmetic unit 20, and the limiter 30 those constituting the vertical sharpening processing unit FEv, the first adder 32, and the second adder 33. Although the circuit structure of this image processing apparatus is basically the same as that of Example 6, the vertical HPF of 15 tap and the horizontal HPF of 15 tap are used to process the up-converted image.

In this image processing apparatus used for the comparison, the up-converter 21 immediately (before the path of the sharpening processing) up-converts the input image signal Sm, and the horizontal sharpening processing unit FEh (the horizontal HPF 14, the nonlinear arithmetic unit 20, and the limiter 30) and the vertical sharpening processing unit FEv (the vertical HPF 15, the nonlinear arithmetic unit 20, and the limiter 30) carry out the sharpening processing in the horizontal direction and the vertical direction, respectively. Then, the first adder 32 and the second adder 33 combines the signal subjected to the sharpening processing and the signal obtained by up-converting the input image signal $S_{in}$.

In this case, each of the up-converters needs 4 multipliers and each of horizontal HPF (15 tap) and vertical HPF (15 tap) needs 8 multipliers Therefore, at the proceeding stage of the nonlinear arithmetic unit 20 (4+8×2) multipliers are necessary. The image processing apparatus of Example 6 in FIG. 12A has the same number of multipliers in total as the image processing apparatus in FIG. 12B. However, since the horizontal HPF and the vertical HPF are disposed at the preceding stages of the up-converters, the circuit scales of the horizontal HPF and the vertical HPF may be downsized and the operation speed may be reduced for power saving, thereby achieving high economic efficiency. That is, since the circuit after the up-converter has an image processing rate that is 4 times higher than that of before the up-converter, more power is consumed in proportion to the number of circuits after the up-converter. Further, when the multipliers cannot operate at the image processing rate that is 4 times higher and has to operate at the image processing rate that is 2 times higher, two identical circuits are used and operated in parallel, which increases the number of circuits. That is, when the circuits having the same function are disposed before the up-converter, it is excellent in terms of downsizing and power saving.

Also, another two-dimensional LPF may be further provided at the subsequent stage of the second adder 33 in order to further ensure the attenuation of the high frequency component. Preferably, this two-dimensional filter removes a region of the frequency component of the output image signal $S_{out}$ at high frequencies in both the horizontal direction and the vertical direction.

EXAMPLE 7

Example 7 also applies the disclosure herein to the image processing apparatus having no two-dimensional LPF for noise removal. Example 7 relates to a circuit in which the horizontal sharpening processing unit FEh and the vertical sharpening processing unit FEv, which are separately provided in Example 6, are commonly provided by using the two-dimensional HPF.

Figure 13:
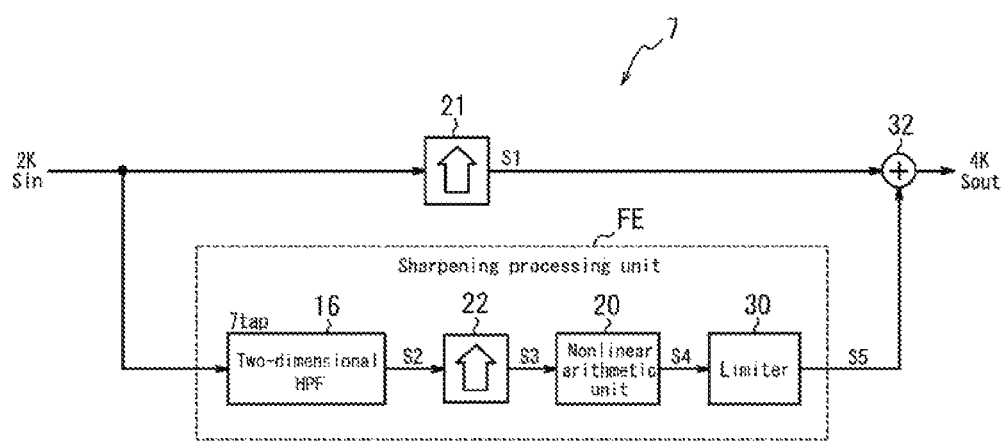
FIG. 13 is a diagram illustrating a configuration of an image processing apparatus according to a seventh embodiment.
Figure 14A:
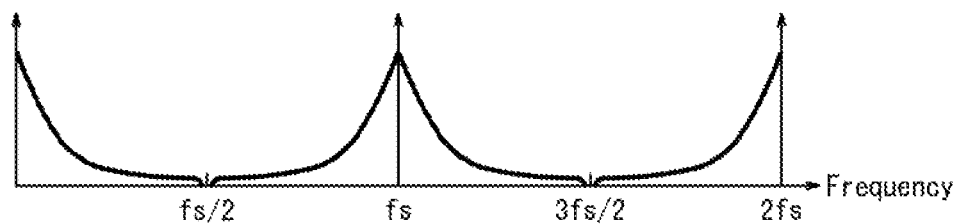
FIGS. 14A to 14D are diagrams illustrating changes of a frequency component caused by enlargement and enhancement processing of an image.
Figure 14B:
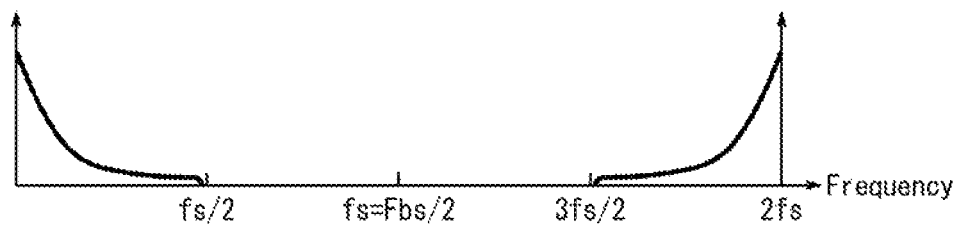
Figure 14C:
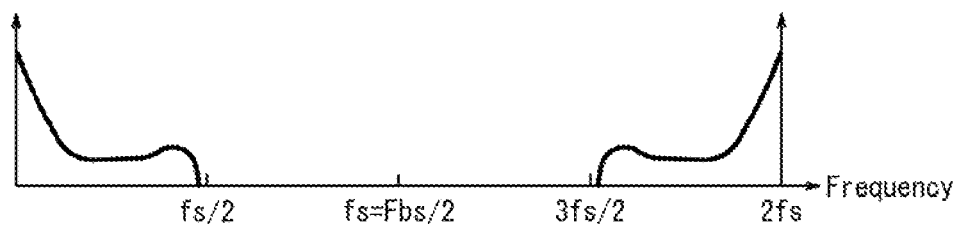
Figure 14D:
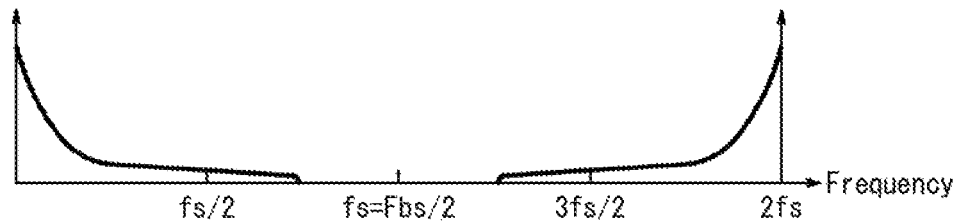
Figure 15:
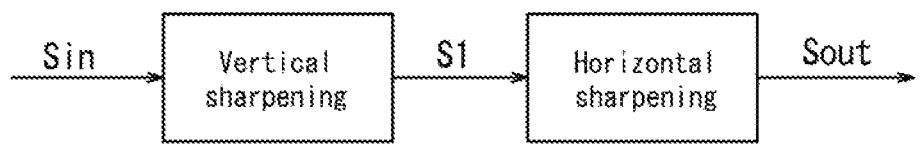
FIG. 15 is a diagram illustrating conventional sharpening processing in a horizontal direction and a vertical direction of an image.
Figure 16A:
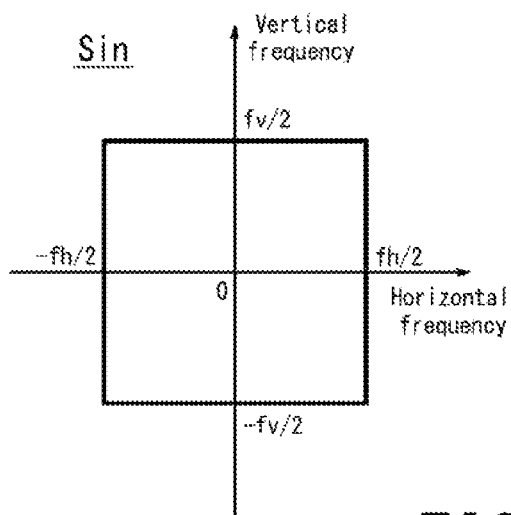
FIGS. 16A to 16C are diagrams illustrating changes of the frequency component caused by the conventional sharpening processing.
Figure 16B:
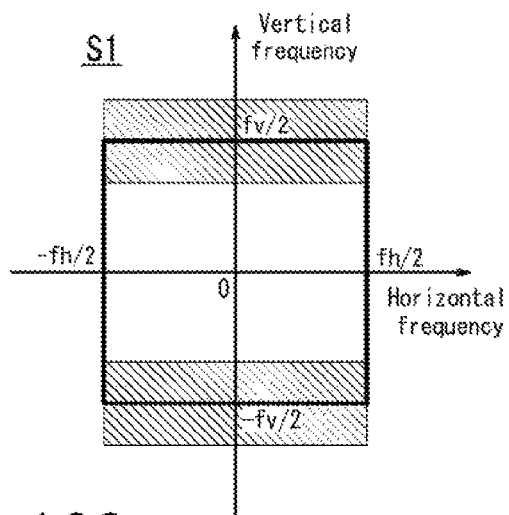
Figure 16C:
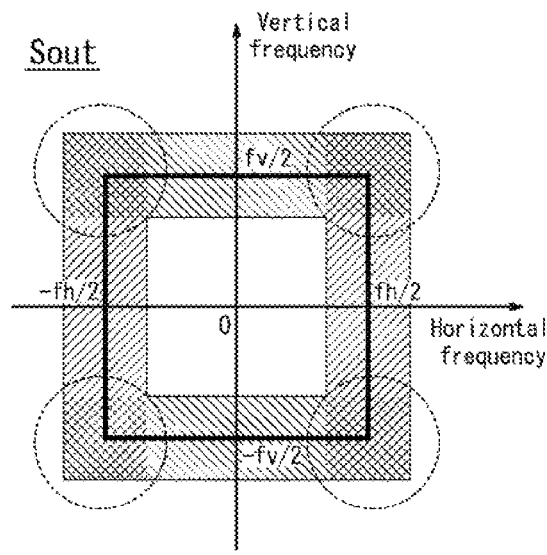
Figure 17:
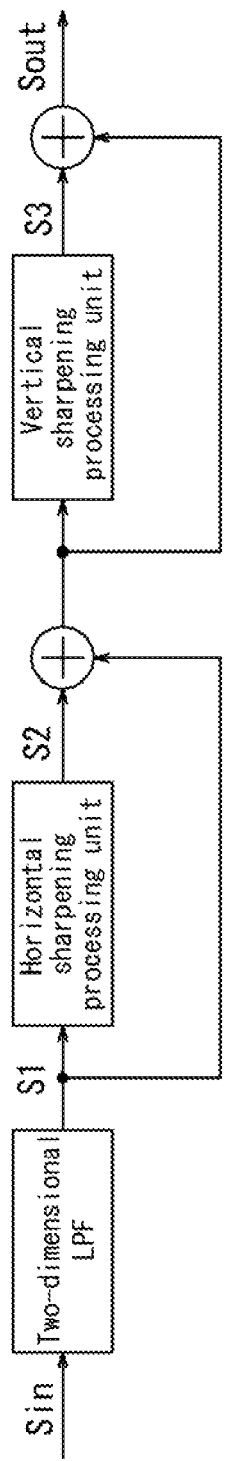
FIG. 17 is a diagram illustrating the conventional sharpening processing using a two-dimensional filter.

FIG. 13 is a diagram illustrating a configuration of an image processing apparatus 7 according to Example 7. The image processing apparatus 7 includes the two-dimensional HPF 16, the nonlinear arithmetic unit 20, and the limiter 30 those constituting the sharpening processing unit FE, two up-converters 21 and 22, and the first adder 32. In the image processing apparatus 7, the functions of the horizontal sharpening processing unit FEh and the vertical sharpening processing unit FEv are substantialized by one sharpening processing unit FE. In the image processing apparatus 7, the up-converter 21 is disposed between the input and the output of the path of the base image signal. Also, the up-converter 22 is disposed between the two-dimensional HPF 16 and the nonlinear arithmetic unit 20 in the sharpening processing unit FE.

The input image signal $S_{in}$ corresponding to, for example, the 2K image is input to the up-converter 21, up-converted into the first signal S1 corresponding to, for example, the 4K image, and then output to the first adder 32.

The sharpening processing unit FE simultaneously generates the harmonic in the horizontal direction containing the frequency component higher than the frequency component in the horizontal direction contained in the input signal and the harmonic in the vertical direction containing the frequency component higher than the frequency component in the vertical direction contained in the input signal by carrying out the nonlinear arithmetic processing one time, and carries out two-dimensional sharpening processing on the input image signal $S_{in}$. In the present example, the up-conversion is carried out within the sharpening processing unit FE.

Within the sharpening processing unit FE, the two-dimensional HPF 16 removes at least the DC component (the low frequency component) of the frequency components in the horizontal direction and the vertical direction contained in the input image signal $S_{in}$ and thus generates the second signal S2, which is the high frequency signal. The up-converter 22 up-converts the second signal S2 into the third signal S3 corresponding to, for example, the 4K image and outputs the third signal S3 to the nonlinear arithmetic unit 20. The nonlinear arithmetic unit 20 carries out, on the third signal S3, the nonlinear arithmetic processing represented by the continuous nonlinear function that passes through the origin and is asymmetric in the positive region and the negative region, and thus generates the fourth signal S4. By this nonlinear arithmetic processing, the harmonic containing the frequency component exceeding the Nyquist frequency in the horizontal direction and the harmonic containing the frequency component exceeding the Nyquist frequency in the vertical direction are simultaneously generated. Note that the process for generating the harmonics is described with reference to FIG. 11. The limiter 30 functions as the adjuster of the amplitude (the signal level) of the fourth signal S4 and generates the fifth signal S5 by adjusting the fourth signal S4, and then outputs the fifth signal S5 to the first adder 32.

The first adder 32 generates the output image signal $S_{out}$ by combining the sixth signal S6 received from the sharpening processing unit FE and the first signal S1 received from the up-converter 21.

In the image processing apparatus 7 of Example 7, at the preceding stage of the nonlinear arithmetic unit, since 10 multipliers are used for the two-dimensional LPF (7×7 tap) for the input image signal $S_{in}$ and 4 multipliers are used for each of the two up-converters, the filter processing and the up-conversion at the preceding stage of the nonlinear arithmetic processing may be substantialized by 18 (10+4×2) multipliers in total. Accordingly, the number of multipliers may be reduced as compared to the conventional image processing apparatus (using 20 multipliers) illustrated in FIG. 12B. Further, the present example may have only one line of the nonlinear arithmetic unit unlike the image processing apparatus in FIG. 12 that needs two lines of the nonlinear arithmetic unit. Generally, in the method of performing the interpolation from four representative points on the non-linear function, 27 multipliers are necessary for the nonlinear arithmetic unit of one line. Therefore, since one line may be omitted, the number of multipliers may be reduced as compared to the conventional image processing apparatus illustrated in FIG. 12B.

According to the present example, also, since the nonlinear arithmetic processing carried out one time generates four corners of the frequency components of the output image signal $S_{out}$, i.e., the range at high frequencies in both the horizontal direction and the vertical direction, efficiency of the arithmetic processing is improved. Further, the phenomenon in which the glittering of the image is emphasized due to the sharpening processing in the horizontal direction and the vertical direction in the overlapping manner as conventionally carried out does not occur.

According to the present example, also, instead of providing two lines of the sharpening processing in the horizontal direction and the vertical direction, one line of the sharpening processing unit FE for carrying out the two-dimensional processing may be provided. Therefore, the number of times of operation of the nonlinear arithmetic processing may be reduced and, as a result, the number of circuits as well as power consumption may be reduced.

Further, another two-dimensional LPF may be further provided at the subsequent stage of the first adder 32 in order to further ensure the attenuation of the high frequency component. Preferably, this two-dimensional filter removes a region of the frequency component of the output image signal $S_{out}$ at high frequencies in both the horizontal direction and the vertical direction.

(Description of Generation of High Frequency Component by Nonlinear Arithmetic Processing)

For reference, the following is a description of a mechanism in which the sharpening processing unit FE in FIG. 1 and FIG. 5 may compensate the high frequency domain exceeding the Nyquist frequency fs/2 of the input image having the sampling frequency fs.

Now, when it is assumed that the input image signal S1 is represented by a function f(x) at a position x (in the horizontal direction) and a fundamental angular frequency of the input image signal $S_{in}$ is represented by ω, the f(x) may be expressed by a Fourier series as shown in Formula 5.

(Formula 5)

$$f(x) = a_{-N}\cos(-N)\omega x + a_{-N+1}\cos(-N+1)\omega x + \ldots + a_{-1}\cos(-1)\omega x + a_0 + a_1\cos\omega x + a_2\cos 2\omega x + \ldots + a_N\cos N\omega x + b_{-N}\sin(-N)\omega x + b_{-N+1}\sin(-N+1)\omega x + \ldots + b_{-1}\sin(-1)\omega x + b_1\sin\omega x + b_2\sin 2\omega x + \ldots + b_N\sin N\omega x \quad (5)$$

Here, N is an order of a harmonic at the highest frequency equal to or lower than the Nyquist frequency fs/2 corresponding to the sampling frequency fs (before image enlargement processing). In other words, $$N\omega/(2\pi) \leq fs/2 \leq (N+1)\omega/(2\pi)$$

is satisfied.

For example, when the nonlinear arithmetic units (20 and 40) generate the first signal S1 by squaring the input image signal $S_{in}$, each section of the first signal S1 is expressed by one of the following Formulae (6a) to (6c).

(Formulae 6)

$$a_i \cos i\omega x \times a_j \cos j\omega x \quad (6a)$$

$$a_i \cos i\omega x \times b_j \sin j\omega x \quad (6b)$$

$$b_i \sin i\omega x \times b_j \sin j\omega x \quad (6c)$$

$$(i = \pm1, \pm2, \ldots, \pm N; j = \pm1, \pm2, \ldots, \pm N)$$

Using a formula of the trigonometric function, the Formulae (6a) to (6c) may be rewritten into the following Formulae (7a) to (7c), respectively.

[Formula 7]

$$\frac{a_i a_j}{2}(\cos(i+j)\omega x + \cos(i-j)\omega x) \quad (7a)$$

$$\frac{a_i b_j}{2}(\cos(i+j)\omega x - \sin(i-j)\omega x) \quad (7b)$$

$$-\frac{b_i b_j}{2}(\sin(i+j)\omega x - \cos(i-j)\omega x) \quad (7c)$$

From the above formulae, $(f(x))^2$ includes an angular frequency component such as $(N+1)\omega$, $(N+2)\omega$, ..., $2N\omega$ and the like, and thus includes the frequency component higher than the Nyquist frequency fs/2. Therefore, the first signal S1 contains the frequency component higher than the Nyquist frequency fs/2 in a manner similar to the harmonic component such as a frequency $2N\omega/(2\pi)$.

Also, for example, when the nonlinear arithmetic units (20 and 40) generate the second signal S2 by raising a positive first signal S1 to the third power, each section of the second signal S2 is expressed by one of the following formulae (8a) to (8d).

(Formulae 8)

$$a_i \cos i\omega x \times a_j \cos j\omega x \times a_k \cos k\omega x \quad (8a)$$

$$a_i \cos i\omega x \times a_j \cos j\omega x \times b_k \sin k\omega x \quad (8b)$$

$$a_i \cos i\omega x \times b_j \sin j\omega x \times b_k \sin k\omega x \quad (8c)$$

$$b_i \cos i\omega x \times b_j \sin j\omega x \times b_k \sin k\omega x \quad (8d)$$

$$(i = \pm1, \pm2, \pm N; j = \pm1, \pm2, \pm N; k = \pm1, \pm2, \pm N)$$

Now, focusing on the sections set forth below expressed by the above Formulae (8a) and (8d) in the sections of i=j=k=N, these sections may be rewritten into the following formulae by using the formula of the trigonometric function.

(Formulae 9)

$$(a_N \cos N\omega x)^3 = a_N^3\{(3/4)\cos N\omega x + (1/4)\cos 3N\omega x\} \quad (9a)$$

$$(a_N \sin N\omega x)^3 = b_N^3\{(3/4)\sin N\omega x - (1/4)\sin 3N\omega x\} \quad (9d)$$

Also, focusing on the sections set forth below expressed by the above Formulae (8a) and (8d) in the sections of i=j=k=−N, these sections may be rewritten into the following formulae by using the formula of the trigonometric function.

(Formulae 10)

$$\{a_N \cos(-N\omega x)\}^3 = a_N^3\{(3/4)\cos(-N\omega x) + (1/4)\cos(-3N\omega x)\} \quad (10a)$$

$$\{a_N \sin(-N\omega x)\}^3 = b_N^3\{(3/4)\sin(-N\omega x) - (1/4)\sin(-3N\omega x)\} \quad (10d)$$

From the above Formulae (9a), (9d), (10a), and (10d), $(g(x))^3$ includes the frequency components of 3N times of, and −3N times of, the fundamental angular frequency ω. By rewriting other sections of $(g(x))^3$ using the formula of the trigonometric function, it can be seen that $(g(x))^3$ includes various frequency components from −3N times to 3N times of the fundamental angular frequency ω.

As described above, because of the nonlinear arithmetic processing carried out by the nonlinear arithmetic units (20 and 40), the sharpening processing unit FE may compensate the high frequency domain exceeding the Nyquist frequency fs/2 of the input image having the sampling frequency fs. Also, the nonlinear arithmetic unit 20 for using the asymmetric nonlinear function, by carrying out the nonlinear arithmetic processing that is symmetric in the positive region and the negative region of the signal subjected to the high pass filter, may generate the frequency component asymmetric between the positive region and the negative region.

INDUSTRIAL APPLICABILITY

The disclosure herein is intended to be applied to the image processing apparatus for improving image quality by sharpening an image, and applicable to, for example, the image enhancement apparatus for sufficiently sharpening the video being displayed in real time with a simple configuration, such as when the display of the high definition television (HDTV) receiver displays an image by carrying out the enlargement processing on the image signal of the standard definition television (SDTV) and when the image signal of the HDTV is up-converted so as to be displayed in the 4K display.

Our image processing apparatus and image processing method are applicable also to image enhancement processing of a monitoring camera and, for example, capable of reducing blur in an enlarged portion of an image.

Our image processing apparatus and image processing method are applicable also to resolution enhancement of an image captured from a distance. For example, an image of an accident site difficult to access taken from a distance or a satellite image may be processed with the image processing for enlarging the image and sharpening the outline.

Our image processing apparatus and image processing method are applicable also to high-definition conversion of analog contents. That is, in order to convert existing analog contents into high-definition contents, the image enhancement processing for sharpening the outline of the up-converted image is carried out. Thereby, the analog contents may be reproduced as digital contents with higher definition. Our image processing apparatus and image processing method are applicable to, for example, conversion of the analog television contents into high-resolution contents, and conversion of contents of an old movie into digital contents with higher definition (for example, Blu-ray (registered trademark) contents).

Also, our image processing apparatus and image processing method are applicable to a medical field. For example, our image processing apparatus and image processing method allow for conversion of an enlarged image of an affected site taken by an endoscope or the like into an image with higher definition image, or conversion of an image of an affected site with low resolution into an image with higher definition.

Further, our image processing apparatus and image processing method are applicable to higher-definition conversion of video contents that can be viewed on a computer. On the internet, there are a number of websites for distributing video contents, and numerous video contents have already been stored. The disclosure herein allows for enlargement of the image of existing video contents and conversion of the contents into contents with higher definition and higher resolution, thereby improving viewing quality.

Although the present invention has been described based on the figures and the embodiments, it is to be understood that various modifications and changes may be implemented based on the present disclosure by those who are ordinarily skilled in the art. Accordingly, such modifications and changes are included in a scope of the present invention. For example, functions and the like included in each unit and each step may be rearranged without logical inconsistency, so as to combine a plurality of units or steps together or to divide them. Also, although the apparatus has been mainly described as the disclosure herein, a method executed by a processor of the apparatus, a program, and a storage medium storing the program may also substantialize the disclosure herein and thus are included in the scope of the disclosure herein.

REFERENCE SIGNS LIST 1, 2, 3, 4, 5, 6, 7 image processing apparatus
10 HPF
111 to 11(m−1) unit delay element
121 to 12m multiplier
131 adder
101 LPF
102 subtractor
11 two-dimensional LPF (horizontal filter)
12 two-dimensional LPF (vertical filter)
13 two-dimensional LPF
14 horizontal HPF
15 vertical HPF
20, 40 nonlinear arithmetic unit
21, 22, 23 up-converter
30 limiter
31 amplifier (switch unit)
32 first adder
33 second adder
34 third adder

The invention claimed is:

1. An image processing apparatus for generating an output image by up-converting an input image and sharpening an image, the image processing apparatus comprising:
a path on a base image side for generating a first signal having an increased number of pixels by up-converting an input image signal representing the input image;
a path on a sharpening processing side for generating a second signal for sharpening the input image by a sharpening processing unit having a nonlinear arithmetic unit configured to generate a frequency component higher than a frequency component contained in the input image signal representing the input image; and
an adder configured to generate an output image signal representing the output image by combining the first signal and the second signal,
at a subsequent stage of at least one filter in the path of the sharpening processing side, an up-converter is disposed, followed by the nonlinear arithmetic unit, wherein
the sharpening processing unit has at least one of:
a first-configuration sharpening processing unit having: a filter unit configured to generate a first high frequency signal by removing at least a DC component of a frequency component contained in an input signal to the sharpening processing unit; a nonlinear arithmetic unit configured to generate a second high frequency signal by carrying out, on the first high frequency signal, nonlinear arithmetic processing that is asymmetric between a positive region and a negative region of the first high frequency signal, the nonlinear arithmetic processing applied to the positive region of the first high frequency signal and the nonlinear arithmetic processing applied to the negative region of the first high frequency signal being represented by a continuous function that passes through an origin, such that a band of frequency components generated by the nonlinear arithmetic processing has asymmetric frequency ranges between the positive region and the negative region; and a limiter configured to generate a sharpening processing unit output signal by adjusting the second high frequency signal, and
a second-configuration sharpening processing unit having: a nonlinear arithmetic unit configured to generate a third high frequency signal by carrying out nonlinear arithmetic processing on an input signal to the sharpening processing unit, the nonlinear arithmetic processing carried out on the input signal such that the third high frequency signal is represented by a continuous nonlinear function and a frequency component not contained in the input signal is generated; a filter unit configured to generate a fourth high frequency signal by removing at least a DC component of a frequency component contained in the third high frequency signal; and a limiter configured to generate a sharpening processing unit output signal by adjusting the fourth high frequency signal.

2. The image processing apparatus according to claim 1, wherein the path on the base image side has a first up-converter, the path of the sharpening processing side has:
a vertical filter configured to remove a high frequency portion of a frequency component in a vertical direction of the input image signal from at least a high frequency portion in a horizontal direction contained in the input image signal;
a second up-converter configured to up-convert an output of the vertical filter;
a horizontal sharpening processing unit configured to generate a harmonic in the horizontal direction containing a frequency component higher than a frequency component in the horizontal direction contained in the input image signal;
a horizontal filter configured to remove a high frequency portion of a frequency component in a horizontal direction of the input image signal from at least a high frequency portion in the vertical direction contained in the input image signal;
a third up-converter configured to up-convert an output of the horizontal filter; and
a vertical sharpening processing unit configured to generate a harmonic in the vertical direction containing a frequency component higher than a frequency component in the vertical direction contained in the input image signal, and
a horizontal direction processing unit having the vertical filter, the second up-converter, and the horizontal sharpening processing unit arranged in the stated order and a vertical direction processing unit having the horizontal filter, the third up-converter, and the vertical sharpening processing unit arranged in the stated order are connected in parallel.

3. The image processing apparatus according to claim 2, comprising an amplifier connected to a subsequent stage of one of the horizontal sharpening processing unit and the vertical sharpening processing unit and also to a preceding state of the other.

4. The image processing apparatus according to claim 3, wherein an amplification factor β of the amplifier satisfies 0≤β≤1.

5. The image processing apparatus according to claim 1, wherein the path on the base image side has a first up-converter, the path of the sharpening processing side has:
a two-dimensional filter configured to remove at least a high frequency portion of frequency components in the horizontal direction and the vertical direction contained in the input image signal;
a second up-converter configured to up-convert an output of the two-dimensional filter;
a horizontal sharpening processing unit configured to generate a harmonic in the horizontal direction containing a frequency component higher than a frequency component in the horizontal direction contained in the input image signal; and
a vertical sharpening processing unit configured to generate a harmonic in the vertical direction containing a frequency component higher than a frequency component in the vertical direction contained in the input image signal, and the two-dimensional filter, the second up-converter, a parallel circuit of the horizontal sharpening processing unit and the vertical sharpening processing unit are connected in the stated order.

6. The image processing apparatus according to claim 5, comprising an amplifier connected to a subsequent stage of one of the horizontal sharpening processing unit and the vertical sharpening processing unit and also to a preceding state of the other.

7. The image processing apparatus according to claim 6, wherein an amplification factor β of the amplifier satisfies 0≤β≤1.

8. The image processing apparatus according to claim 1, wherein the path on the base image side has a first up-converter, the path of the sharpening processing side has:
a horizontal high pass filter configured to remove at least a DC component of a frequency component in the horizontal direction;
a second up-converter configured to up-convert an output of the horizontal high pass filter;
a first nonlinear arithmetic unit configured to generate a harmonic in the horizontal direction containing a frequency component higher than a frequency component in the horizontal direction contained in the input image signal;
a vertical high pass filter configured to remove at least a DC component of a frequency component in the vertical direction;
a third up-converter configured to up-convert an output of the vertical high pass filter; and
a second nonlinear arithmetic unit configured to generate a harmonic in the vertical direction containing a frequency component higher than a frequency component in the vertical direction contained in the input image signal, and
a horizontal sharpening processing unit having the horizontal high pass filter, the second up-converter, and the first nonlinear arithmetic unit arranged in the stated order and a vertical sharpening processing unit having the vertical high pass filter, the third up-converter, and the second nonlinear arithmetic unit arranged in the stated order are connected in parallel.

9. The image processing apparatus according to claim 8, wherein
the horizontal sharpening processing unit further has a limiter at a subsequent stage of the first nonlinear arithmetic unit, and
the vertical sharpening processing unit further has a limiter at a subsequent stage of the second nonlinear arithmetic unit.

10. The image processing apparatus according to claim 8, wherein the path on the sharpening processing side further has:
a vertical filter configured to remove a high frequency portion of a frequency component in the vertical direction of the input image signal from at least a high frequency portion in the horizontal direction contained in the input image signal; and
a horizontal filter configured to remove a high frequency portion of a frequency component in the horizontal direction of the input image signal from at least a high frequency portion in the vertical direction contained in the input image signal, the vertical filter is disposed at a preceding stage of the horizontal sharpening processing unit, and the horizontal filter is disposed at a preceding stage of the vertical sharpening processing unit.

11. The image processing apparatus according to claim 8, wherein the path on the sharpening processing side further has a two-dimensional filter configured to remove at least a high frequency portion of the frequency components in the horizontal direction and the vertical direction contained in the input image signal, and at a subsequent stage of the two-dimensional filter, the horizontal sharpening processing unit and the vertical sharpening processing unit are connected in parallel.

12. The image processing apparatus according to claim 1, wherein the path on the base image side has a first up-converter, the path on the sharpening processing side has at least:

a two-dimensional high pass filter configured to remove at least a DC component of the frequency components in the horizontal direction and the vertical direction;

a second up-converter configured to up-convert an output of the two-dimensional high pass filter; and a nonlinear arithmetic unit configured to generate simultaneously a harmonic in the horizontal direction containing a frequency component higher than a frequency component in the horizontal direction contained in the input image signal and a harmonic in the vertical direction containing a frequency component higher than a frequency component in the vertical direction contained in the input image signal, and the two-dimensional high pass filter, the second up-converter, and the nonlinear arithmetic unit are connected in the stated order.

13. The image processing apparatus according to claim 12, wherein the path on the sharpening processing side further has a limiter at a subsequent stage of the nonlinear arithmetic unit.

14. The image processing apparatus according to claim 12, wherein the path on the sharpening processing side further has, at a preceding stage of the two-dimensional high pass filter, a two-dimensional low pass filter configured to remove at least a high frequency portion of the frequency components in the horizontal direction and the vertical direction contained in the input image signal.

15. An image processing method of an image processing apparatus for generating an output image by up-converting an input image and sharpening an image, the image processing method comprising:

a step of generating a first signal having an increased number of pixels by up-converting an input image signal representing the input image;

a step of generating a second signal for sharpening the input image by carrying out sharpening processing having nonlinear arithmetic processing for generating a frequency component higher than a frequency component contained in the input image signal representing the input image; and a step of generating an output image signal representing the output image by combining the first signal and the second signal, wherein at the step of generating the second signal, after at least one filter processing, up-conversion is carried out, followed by the nonlinear arithmetic processing, and the sharpening processing carries out at least one of:

a first-configuration sharpening processing having: a step of generating a first high frequency signal by removing at least a DC component of a frequency component contained in an input signal to a sharpening processing unit; a nonlinear arithmetic processing step of generating a second high frequency signal by carrying out, on the first high frequency signal, nonlinear arithmetic processing that is asymmetric between a positive region and a negative region of the first high frequency signal, the nonlinear arithmetic processing applied to the positive region of the first high frequency signal and the nonlinear arithmetic processing applied to the negative region of the first high frequency signal being represented by a continuous function that passes through an origin, such that a band of frequency components generated by the nonlinear arithmetic processing has asymmetric frequency ranges between the positive region and the negative region; and a step of generating a sharpening processing unit output signal by adjusting the second high frequency signal, and a second-configuration sharpening processing having: a nonlinear arithmetic processing step of generating a third high frequency signal by carrying out the nonlinear arithmetic processing on an input signal to the sharpening processing unit, such that the third high frequency signal is represented by a continuous nonlinear function and a frequency component not contained in the input signal is generated; a step of generating a fourth high frequency signal by removing at least a DC component of a frequency component contained in the third high frequency signal; and a step of generating the sharpening processing unit output signal by adjusting the fourth high frequency signal.

16. The image processing method according to claim 15, wherein the step of generating the first signal has a step of carrying out first up-conversion, and the step of generating the second signal has:

a horizontal direction processing step of removing a high frequency portion of a frequency component in a vertical direction of the input image signal from at least a high frequency portion in a horizontal direction contained in the input image signal, carrying out second up-conversion, and then carrying out horizontal sharpening processing for generating a harmonic in the horizontal direction containing a frequency component higher than a frequency component in the horizontal direction contained in the input image signal; and a vertical direction processing step of removing a high frequency component of a frequency component in the horizontal direction of the input image signal from at least a high frequency portion in the vertical direction contained in the input image signal, carrying out third up-conversion, and then carrying out vertical sharpening processing for generating a harmonic in the vertical direction containing a frequency component higher than a frequency component in the vertical direction contained in the input image signal, and the horizontal direction processing step and the vertical direction processing step are executed in parallel.

17. The image processing method according to claim 16, comprising a step of changing, based on an amplification factor $\beta$, between serial execution and parallel execution of the horizontal sharpening processing and the vertical sharpening processing.

18. The image processing method according to claim 17, wherein the amplification factor $\beta$ satisfies $0 \leq \beta \leq 1$.

19. The image processing method according to claim 15, wherein the step of generating the first signal has a step of carrying out first up-conversion, and the step of generating the second signal removes at least a high frequency portion of frequency components in a horizontal direction and a vertical direction contained in the input image signal, carries out second up-conversion, and then carries out parallel execution of the horizontal sharpening processing for generating a harmonic in the horizontal direction containing a frequency component higher than a frequency component in the horizontal direction contained in the input image signal and the vertical sharpening processing for generating a harmonic in the vertical direction containing a frequency component higher than a frequency component in the vertical direction contained in the input image signal.

20. The image processing method according to claim 19, comprising a step of changing, based on an amplification factor β, between serial execution and parallel execution of the horizontal sharpening processing and the vertical sharpening processing.

21. The image processing method according to claim 20, wherein the amplification factor β satisfies 0≤β≤1.

22. The image processing method according to claim 15, wherein the step of generating the first signal has a step of carrying out first up-conversion,
the step of generating the second signal has:
a horizontal sharpening processing step of removing at least a DC component of a frequency component in the horizontal direction, carrying out second up-conversion, and then carrying out first nonlinear arithmetic processing for generating a harmonic in the horizontal direction containing a frequency component higher than a frequency component in the horizontal direction contained in the input image signal; and
a vertical sharpening processing step of removing at least a DC component of a frequency component in the vertical direction, carrying out third up-conversion, and then carrying out second nonlinear arithmetic processing for generating a harmonic in the vertical direction containing a frequency component higher than a frequency component in the vertical direction contained in the input image signal, and
the horizontal sharpening processing step and the vertical sharpening processing step are carried out in parallel.

23. The image processing method according to claim 22, wherein
the horizontal sharpening processing step further has limiter processing after the first nonlinear arithmetic processing, and
the vertical sharpening processing step further has limiter processing after the second nonlinear arithmetic processing.

24. The image processing method according to claim 22, wherein the step of generating the second signal further has:
before the horizontal sharpening processing, a step of removing a high frequency portion of a frequency component in the vertical direction of the input image signal from at least a high frequency portion in the horizontal direction contained in the input image signal; and
before the vertical sharpening processing, a step of removing a high frequency portion of a frequency component in the horizontal direction of the input image signal from at least a high frequency portion in the vertical direction contained in the input image signal.

25. The image processing method according to claim 22, wherein the step of generating the second signal further has a step of removing at least a high frequency portion of the frequency components in the horizontal direction and the vertical direction contained in the input image signal, and then executes the horizontal sharpening processing step and the vertical sharpening processing step in parallel.

26. The image processing method according to claim 15, wherein
the step of generating the first signal has a step of carrying out first up-conversion, and
the step of generating the second signal removes at least a DC component of the frequency components in the horizontal direction and the vertical direction, carries out second up-conversion, and then carries out nonlinear arithmetic processing for simultaneously generating a harmonic in the horizontal direction containing a frequency component higher than a frequency component in the horizontal direction contained in the input image signal and a harmonic in the vertical direction containing a frequency component higher than a frequency component in the vertical direction contained in the input image signal.

27. The image processing method according to claim 26, wherein the step of generating the second signal further has limiter processing after the nonlinear arithmetic processing.

28. The image processing method according to claim 26, wherein the step of generating the second signal further has a step of removing, before removing at least DC components of the frequency components in the horizontal direction and the vertical direction, at least a high frequency portion of the frequency components in the horizontal direction and the vertical direction contained in the input image signal.

* * * * *

UNITED STATES PATENT AND TRADEMARK OFFICE
CERTIFICATE OF CORRECTION

PATENT NO. : 9,848,163 B2
APPLICATION NO. : 14/912451
DATED : December 19, 2017
INVENTOR(S) : Seiichi Gohshi et al.

It is certified that error appears in the above-identified patent and that said Letters Patent is hereby corrected as shown below:

In the Specification

Column 6, Line 41, please delete "f3" and insert --$\beta$--.

Column 13, Line 18, please delete "Sm" and insert --$S_{in}$--.

Column 15, Line 56, please delete "Si" and insert --S1--.

Column 17, Line 63, please delete "(5)" and insert --(4)--.

Column 18, Line 8, please delete "Si" and insert --S1--.

Column 22, Line 39, please delete "1=j-3" and insert --l=j-3--.

Column 25, Line 12, please delete "Sm" and insert --$S_{in}$--.

Column 33, Line 54, please delete "Si" and insert --$S_{in}$--.

Column 36, Line 55, please delete "Sm" and insert --$S_{in}$--.

Column 39, Line 15, please delete "S1" and insert --$S_{in}$--.

Column 39, Line 53, please delete "[Formula 7]" and insert --(Formulae 7)--.

Column 40, Line 16, please delete "$b_i$ cos" and insert --$b_i$ sin--.

Column 40, Line 18, please delete "($i=\pm 1, \pm 2, \pm N; j=\pm 1, \pm 2, \pm N; k=\pm 1, \pm 2, \pm N$)" and insert --($i=\pm 1, \pm 2, ..., \pm N; j=\pm 1, \pm 2, ..., \pm N; k=\pm 1, \pm 2, \pm N$)--.

Signed and Sealed this
Thirteenth Day of March, 2018

Andrei Iancu
*Director of the United States Patent and Trademark Office*